US011979206B2

(12) United States Patent
Boudreau et al.

(10) Patent No.: US 11,979,206 B2
(45) Date of Patent: May 7, 2024

(54) ONLINE CONVEX OPTIMIZATION WITH PERIODIC UPDATES FOR DOWNLINK MULTI-CELL MIMO WIRELESS NETWORK VIRTUALIZATION

(71) Applicant: Telefonaktiebolaget LM Ericsson (publ), Stockholm (SE)

(72) Inventors: Gary Boudreau, Kanata (CA); Ben Liang, Whitby (CA); Juncheng Wang, Toronto (CA); Min Dong, Whitby (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 35 days.

(21) Appl. No.: 17/789,951

(22) PCT Filed: Mar. 30, 2020

(86) PCT No.: PCT/IB2020/053022
§ 371 (c)(1),
(2) Date: Jun. 29, 2022

(87) PCT Pub. No.: WO2021/161077
PCT Pub. Date: Aug. 19, 2021

(65) Prior Publication Data
US 2023/0058926 A1    Feb. 23, 2023

Related U.S. Application Data

(60) Provisional application No. 62/976,656, filed on Feb. 14, 2020.

(51) Int. Cl.
H04B 7/0452 (2017.01)
H04B 7/024 (2017.01)
H04B 7/06 (2006.01)

(52) U.S. Cl.
CPC ........... *H04B 7/0452* (2013.01); *H04B 7/024* (2013.01); *H04B 7/0615* (2013.01)

(58) Field of Classification Search
CPC ..... H04B 7/0452; H04B 7/024; H04B 7/0615
See application file for complete search history.

(56) References Cited

U.S. PATENT DOCUMENTS 9,979,458 B1   5/2018  Sivasivaganesan et al.
2012/0002743 A1  1/2012  Cavalcante et al.
(Continued)

FOREIGN PATENT DOCUMENTS

CN       105163380 A    12/2015
WO     2018207031 A1    11/2018

OTHER PUBLICATIONS

International Search Report and Written Opinion dated Nov. 9, 2021 issued in PCT Application No. PCT/IB2021/057106 filed Aug. 3, 2021, consisting of 17 pages.
(Continued)

*Primary Examiner* — Janice N Tieu
(74) *Attorney, Agent, or Firm* — Weisberg I.P. Law, P.A.

(57) ABSTRACT

A method and network node for online coordinated multi-cell precoding are provided. According to one aspect, a method includes receiving from each of the plurality of service providers a virtual precoder matrix determined by the corresponding service provider. The method also includes determining a precoder matrix by minimizing a precoding deviation from a virtualization demand of the network subject to at least one power constraint, the virtualization demand being based at least in part on a product of a channel state matrix and a virtual precoder matrix. The method further includes applying the determined precoder matrix to signals applied to a plurality of antennas to achieve a sum of throughputs for the plurality of service providers that is greater than a sum of throughputs for the plurality of
(Continued)

service providers achievable when the virtual precoder matrices are applied to the signals.

20 Claims, 13 Drawing Sheets

(56) References Cited

U.S. PATENT DOCUMENTS

| | | | |
|---|---|---|---|
| 2014/0177461 | A1* | 6/2014 | Seyedmehdi ........ H04B 7/026 370/336 |
| 2014/0317241 | A1 | 10/2014 | Zhao et al. |
| 2017/0019297 | A1 | 1/2017 | Rakib |
| 2017/0064675 | A1 | 3/2017 | Kim et al. |
| 2017/0250739 | A1 | 8/2017 | Guerreiro et al. |
| 2018/0248639 | A1 | 8/2018 | He et al. |
| 2018/0331731 | A1 | 11/2018 | Boudreau et al. |
| 2019/0260434 | A1* | 8/2019 | Park ................... H04B 7/0479 |
| 2023/0014932 | A1* | 1/2023 | Huang ................. H04B 7/0413 |

OTHER PUBLICATIONS

Wang et al., Online Precoding Design for Downlink MIMO Wireless Network Virtualization with Imperfect CSI; IEEE INFOCOM 2020; IEEE Conference on Computer Communications, IEEE; Jul. 6, 2020, consisting of 10 pages.
Wang et al., Online MIMO Wireless Network Virtualization Over Time-Varying Channels with Periodic Updates; May 26, 2020 IEEE 21st International Workshop on Signal Processing Advances in Wireless Communication (SPAWC), consisting of 5 pages.
Eric C. Hall et al., Online Convex Optimization in Dynamic Environments, IEEE Journal of Selected Topics in Signal Processing, vol. 9, No. 4, Jun. 2015, consisting of 16 pages.
Ali Jadbabaie et al., Online Optimization: Competing with Dynamic Comparators, Proc. Intel. Conf. Artif. Intell. Statist., May 2015, consisting of 9 pages.
Xuanyu Cao et al., Impact of Delays on Constrained Online Convex Optimization; Proc. Asilomar Conf. Signal Sys. Compu., Nov. 2019, consisting of 4 pages.
David Gesbert et al., Multi-Cell MIMO Cooperative Networks: A New Look at Interference; IEEE Journal on Selected Areas in Communications, vol. 28, No. 9; Dec. 2010, consisting of 29 pages.
Hongyuan Zhang et al., Asynchronous Interference Mitigation in Cooperative Base Station Systems; IEEE Transactions on Wireless Communications, vol. 7, No. 1; Jan. 2008, consisting of 11 pages.
Hayssam Dahrouj et al., Coordinated Beamforming for the Multi-Cell Multi-Antenna Wireless System; IEEE Transactions on Wireless Communications, vol. 9; May 2010, consisting of 6 pages.
Luca Venturino et al., Coordinated Linear Beamforming in Downlink Multi-Cell Wireless Networks; IEEE Transactions on Wireless Communications, vol. 9, No. 4; Apr. 2010, consisting of 11 pages.
Desmond W.H. Cai et al., Max-Min SINR Coordinated Multipoint Downlink Transmission—Duality and Algorithms; IEEE Transactions on Signal Processing, vol. 60, No. 10; Oct. 2012, consisting of 12 pages.
Antti Toskala et al., UTRAN Long-Term Evolution; John Wiley & Sons, Ltd.; 2010, consisting of 29 pages.
Leonidas Georgiadis et al., Resource Allocation and Cross Layer Control in Wireless Networks; Found. Trends Networks; 2006 Now Publishers Inc., consisting of 146 pages.
Tianyi Chen, et al., Stochastic Averaging for Constrained Optimization With Application to Online Resource Allocation; IEEE Transactions on Signal Processing, vol. 65, No. 12; Jun. 2017, consisting of 16 pages.
Notice of Allowance dated May 12, 2023 issued in U.S. Appl. No. 17/425,427, consisting of 11 pages.
International Search Report and Written Opinion dated Aug. 31, 2021 issued in PCT Application No. PCT/IB2021/054717, consisting of 13 pages.

N.M. Mosharaf Kabir Chowdhury et al., Network Virtualization: State of the Art and Research Challenges; Topics in Network and Service Management; IEEE Communications Magazine, Jul. 2009, consisting of 7 pages.
Ami Wiesel, et al., Linear Precoding via Conic Optimization for Fixed MIMO Receivers; IEEE Transactions on Signal Processing, vol. 54, No. 1; Jan. 2006, consisting of 16 pages.
Yi Jiang, et al., Performance Analysis of ZF and MMSE Equalizers for MIMO Systems: An In-Depth Study of the High SNR Regime; IEEE Transactions on Information Theory, vol. 57, No. 4; Apr. 2011, consisting of 19 pages.
Oren Somekh, et al., Cooperative Multicell Zero-Forcing Beamforming in Cellular Downlink Channels; IEEE Transactions on Information Theory, vol. 55, No. 7; Jul. 2009, consisting of 14 pages.
Hao Yu et al., A Low Complexity Algorithm with $O(\sqrt{T})$ Regret and $O(1)$ Constraint Violations for Online Convex Optimization with Long Term Constraints; Journal of Machine Learning Research, vol. 21, Feb. 2020, consisting of 24 pages.
Xin Wang et al., Wireless Network Virtualization; International Conference on Computing, Networking and Communications, Invited Position Papers; Jan. 2013, consisting of 5 pages.
Matias Richart et al., Resource Slicing in Virtual Wireless Networks: A Survey; IEEE Transactions on Network and Service Management, vol. 13, No. 3; Sep. 2016, consisting of 15 pages.
Vikas Jumba et al., Resource Provisioning in Wireless Virtualized Networks via Massive-MIMO; IEEE Wireless Communications Letter, vol. 4, No. 3; Jun. 2015, consisting of 4 pages.
Kun Zhu et al., Virtualization of 5G Cellular Networks as a Hierarchical Combinatorial Auction; IEEE Transactions on Mobile Computing, vol. 15, No. 10; Oct. 2016, consisting of 15 pages.
Juncheng Wang et al., Online Downlink MIMO Wireless Network Virtualization in Fading Environments, IEEE, 2019, consisting of 5 pages.
Juncheng Wang et al., Online Precoding Design for Downlink MIMO Wireless Network Virtualization with Imperfect CSI; IEEE Int. Conf. Comput. Commun. (INFOCOM), Apr. 2020, consisting of 9 pages.
Hayssam Dahrouj et al., Coordinated Beamforming for the Multi-Cell Multi-Antenna Wireless System; IEEE Transactions on Wireless Communications; 2008, consisting of 6 pages.
Wang et al., Online Downlink MIMO Wireless Network Virtualization in Fading Environments; Dec. 9, 2019 IEEE Global Communications Conference (GLOBECOM), IEEE, consisting of 6 pages.
Saeedeh Parsaeefard, et al., Dynamic Resource Allocation for Virtualized Wireless Networks in Massive-MIMO-Aided and Fronthaul-Limited C-RAN; IEEE Transactions on Vehicular Technology, vol. 66, No. 10; Oct. 2017, consisting of 9 pages.
International Search Report and Written Opinion dated Jun. 9, 2020 issued in PCT Application No. PCT/IB2020/053454, consisting of 15 pages.
Sucha Supittayapompong et al., Quality of Information Maximization for Wireless Networks via a Fully Separable Quadratic Policy; IEEE/ACM Transactions on Networking, vol. 23, No. 2, Apr. 2015, consisting of 13 pages.
Juncheng Wang et al., Online Downlink MIMO Wireless Network Virtualization in Fading Environments, IEEE, 2019, consisting of 6 pages.
Xin Wang et al., Wireless Network Virtualization, Journal of Communications vol. 8, No. 5, May 2013, consisting of 8 pages.
Jonathan van de Belt, et al., Defining and Surveying Wireless Link Virtualization and Wireless Network Virtualization, The Center for Future Networks and Communications, 2017, consisting of 25 pages.
Chengchao Liang et al., Wireless Network Virtualization: A Survey, Some Research Issues and Challenges, 2014 EEE Communications Surveys & Tutorials, consisting of 24 pages.
Matias Richart et al., Resource Slicing in Virtual Wireless Networks: A Survey, IEEE Transactions on Network and Service Management, Sep. 2016, consisting of 14 pages.
V. Jumba et al., Resource Provisioning in Wireless Virtualized Networks Via Massive-MIMO, IEEE Wireless Communications Letters, Jun. 2015, consisting of 5 pages.

(56) References Cited

OTHER PUBLICATIONS

Chang et al., Energy Efficient Optimization for Wireless Virtualized Small Cell Networks With Large-Scale Multiple Antenna, IEEE Transaction on Communications, 2017, consisting of 12 pages.
Kun Zhu et al., Virtualization of 5G Cellular Networks as a Hierarchical Combinatorial Auction, IEEE Transations on Mobile Computing, 2016, consisting of 16 pages.
Ye Liu et al., Antenna Allocation and Pricing in Virtualized Massive MIMO Networks via Stackelberg Game, IEEE Transactions on Communications, vol. 66, No. 11, Nov. 2018, consisting of 15 pages.
Daniel Tweed et al., Dynamic Resource Allocation for Uplink MIMO NOMA VWN With Imperfect SIC, IEEE International Conference on Communications (ICC), May 2018, consisting of 6 pages.
Saeedeh Parsaeefard et al., Dynamic Resource Allocation for Virtualized Wireless Networks in Massive-MIMO-Aided and Fronthaul-Limited C-RAN, Oct. 2017, consisting of 10 pages.
Mohammadmoein Soltanizadeh et al., Power Minimization in Wireless Network Virtualization With Massive MIMO, Prov. Intel. Conf. Communications Workshop on 5G Architecture, 2018, consisting of 6 pages.
M.J. Neely et al., Stochastic Network Optimization With Application on Communication and Queueing Systems, Morgan & Claypool, 2010, consisting of 211 pages.
Fatemeh Amirnavaei, et al., Online Power Control Optimization for Wireless Transmission With Energy Harvesting and Storage, IEEE Transactions on Wireless Communications, Jul. 2016, consisting of 14 pages.
Panayotis Mertikopoulos et al., Learning to Be Green: Robust Energy Efficiency Maximation in Dynamic MIMO-OFDM Systems, IEEE Journal on Selected Areas in Communications, Apr. 2016, consisting of 25 pages.
Panayotis Mertikopoulos et al., Learning in an Uncertain World: MIMO Covariance Matrix Optimization with Imperfect Feedback, IEEE Transactions on Wireless Communications, Jun. 2017, consisting of 27 pages.
Hao Yu, et al., Dynamic Transmit Covariance Design in MIMO Fading Systems with Unknown Channel Distributions and Inaccurate Channel State Information, IEEE Transactions on Wireless Communications, Jun. 2017, consisting of 16 pages.
Harri Holma et al., UTRAN Long-Term Evolution, WCDMA for UMTS-HSPA Evolution and LTE, John Wieley & Sons, 2010, consisting of 29 pages.
Andrea Goldsmith, Wireless Communications, Stanford University Press, 2005, consisting of 427 pages.
Antonio Assalini et al., Linear MMSE MIMO Channel Estimation with Imperfect Channel Covariance Information, Proc. Intel. Conf. Communications (ICC) Jun. 2009, consisting of 6 pages.
International Search Report and Written Opinion dated Sep. 24, 2020 issued in PCT Application No. PCT/IB2020/053022, consisting of 14 pages.
Shai Shalev-Shwartz, Online Learning and Online Convex Optimization, Benin School of Computer Science and Engineering, The Hebrew University of Jerusalem, Israel, vol. 4, No. 2, Feb. 2012, consisting of 22 pages.
Elad Hazan, Introduction to Online Convex Optimization, Found. Trends Optim. vol. 2, No. 3-4, Aug. 2016, consisting of 178 pages.
Martin Zinkevich, Online Convex Programming and Generalized Infinitesimal Gradient Ascent, Proceedings of the Twentieth International Conference on Machine Learning, Washington, D.C., 2003, consisting of 8 pages.
Mehrdad Mahdavi et al., Trading Regret for Efficiency: Online Convex Optimization with Long Term Constraints, Journal of Machine Learning Research vol. 13, No. 1, Sep. 2012, consisting of 26 pages.
Rodolphe Jenatton, et al., Adaptive Algorithms for Online Convex Optimization with Long-Term Constraints, Proceedings of the International Conference of Machine Learning, 2016, consisting of 10 pages.

Alec Koppel et al., A Saddle Point Algorithm for Networked Online Convex Optimization, IEEE Transactions on Signal Processing, vol. 63, No. 19, Oct. 2015, consisting of 16 pages.
Alec Koppel et al., Proximity Without Consensus in Online Mutiagent Optimization, IEEE Transactions on Signal Processing, vol. 65, No. 12, Jun. 2017, consisting of 16 pages.
Hao Yu et al., A Low Complexity Algorithm with $O(\sqrt{T})$ Regret and Finite Constraint Violations for Online Convex Optimization with Long Term Constraints, Department of Electrical Engineering, University of Southern California, Oct. 2016, consisting of 15 pages.
Michael J. Neely et al., Online Convex Optimization with Time-Varying Constraints, University of Southern California, 2017, consisting of 18 pages.
Xuanyu Cao et al., A Virtual-Queue-Based Algorithm for Constrained Online Convex Optimization With Applications to Data Center Resource Allocation, IEEE Journal of Selected Topics in Signal Processing, vol. 12, No. 4, Aug. 2018, consisting of 14 pages.
Tianyi Chen et al., An Online Convex Optimization Approach to Proactive Network Resource Allocation, IEEE Transactions on Signal Processing, vol. 65, No. 24, Dec. 15, 2017, consisting of 15 pages.
Marcelo J. Weinberger et al., On Delayed Prediction of Individual Sequences, IEEE Trans. Inf. Theory, vol. 48, No. 7, Jul. 2002, consisting of 43 pages.
John Langford et al., Slow Learners are Fast, Machine Learning, Yahoo!, Labs and Australian National University, Proc. Advances in Neural Info. Process Systems, 2009, consisting of 9 pages.
H. Brendan McMahan et al., Delay-Tolerant Algorithms for Asynchronous Distributed Online Learning, Proc. Advances In Neural Info. Process Systems, 2014, consisting of 9 pages.
Pooria Joulani et al., Delay-Tolerant Online Convex Optimization: Unified Analysis and Adaptive-Gradient Algorithms, Proceedings of the Thirtieth AAAI Conference on Artificial Intelligence (AAAI-16) 2016, consisting of 7 pages.
Kent Quanrud et al., Online Learning with Adversarial Delays, Department of Computer Science, University of Illinois at Urbana-Champaign, Adv. Neural Info. Process Systems, 2015, consisting of 9 pages.
Jim Zyren et al., Overview of the 3GPP Long Term Evolution Physical Layer, Freescale Semiconductor Inc., 2007, consisting of 27 pages.
D.H. Brandwood, A Complex Gradient Operator and its Application in Adaptive Array Theory, IEEE Proceedings H—Microwaves, Optics, and Antennas, Feb. 1983, consisting of 6 pages.
Stephen Boyd, Convex Optimization, Department of Electrical Engineering Stanford University, Cambridge University Press, 2004, consisting of 730 pages.
Michael C. Grant et al., The CVX User's Guide Release 2.1, Dec. 2018, consisting of 99 pages.
Muriel Medard, The Effect Upon Channel Capacity in Wireless Communications of Perfect and Imperfect Knowledge of the Channel, IEEE Transactions on Information Theory, vol. 46, No. 3, May 2000, consisting of 14 pages.
Ibrahim Abou-Faycal et al., Binary Adaptive Coded Pilot Symbol Assisted Modulation Over Rayleigh Fading Channels Without Feedback, IEEE Transactions on Communications, vol. 53, No. 6, Jun. 2005, 11 pages.
Roberto Corvaja et al., Phase Noise Degradation in Massive MIMO Downlink With Zero-Forcing and Maximum Ratio Transmission Precoding, IEEE Transaction on Vehicular Technology, vol. 65, No. 10, Oct. 2016, consisting of 8 pages.
Non-Final Office Action dated Mar. 15, 2022 issued in U.S. Appl. No. 17/425,427, consisting of 19 pages.
International Preliminary Report on Patentability issued in PCT Application No. PCT/IB2020/053454 dated Sep. 28, 2021, consisting of 8 pages.
Non Final Office Action dated Sep. 29, 2022 issued in U.S. Appl. No. 17/425,427, consisting of 11 pages.

(56) References Cited

OTHER PUBLICATIONS

Chinese Office Action and Search Report with English Machine Translation dated Dec. 6, 2023 for Patent Application No. 202080028258.6, consisting of 18 pages.

* cited by examiner

ONLINE CONVEX OPTIMIZATION WITH PERIODIC UPDATES FOR DOWNLINK MULTI-CELL MIMO WIRELESS NETWORK VIRTUALIZATION

CROSS-REFERENCE TO RELATED APPLICATIONS

This application is a Submission Under 35 U.S.C. § 371 for U.S. National Stage Patent Application of International Application No.: PCT/IB2020/053022, filed Mar. 30, 2020 entitled "ONLINE CONVEX OPTIMIZATION WITH PERIODIC UPDATES FOR DOWNLINK MULTI-CELL MIMO WIRELESS NETWORK VIRTUALIZATION," which claims priority to U.S. Provisional Application No. 62/976,656, filed Feb. 14, 2020, entitled "ONLINE CONVEX OPTIMIZATION WITH PERIODIC UPDATES FOR DOWNLINK MULTI-CELL MIMO WIRELESS NETWORK VIRTUALIZATION," the entireties of both of which are incorporated herein by reference.

TECHNICAL FIELD

This disclosure is related to wireless communication and in particular, to online convex optimization (OCO) with periodic updates for downlink multi-cell multiple input multiple output (MIMO) wireless network virtualization.

BACKGROUND

OCO has emerged as a promising solution to many signal processing and resource allocation problems in the presence of uncertainty. In OCO, at the beginning of each time slot, an agent makes a decision from a known convex set. At the end of each time slot, the system reveals the convex loss function to the agent, and then the agent's loss is realized. The convex loss function can change arbitrarily at each time slot with unknown statistics. It is thus not possible for an OCO algorithm to make an optimal decision at each time slot due to the lack of in-time information of the convex loss function. Thus, a goal of an OCO algorithm is to make a sequence of decisions to minimize the regret, i.e., the performance gap of the accumulated loss to an optimal offline fixed strategy with all convex loss functions known in hindsight. An OCO algorithm should provide sub-linear regret, i.e., the gap from the optimal offline performance benchmark, in terms of time-averaged loss, tends to zero as time approaches infinity. With the bounded gradient or sub-gradient assumption, an online projected gradient descent algorithm achieves an $O(\sqrt{T})$ regret in a seminal work of OCO, where T is the total time horizon.

OCO with long-term constraints has been considered, in which short-term constraints are relaxed to long-term constraints to circumvent the computational challenge of the projection operator. An OCO algorithm with long-term constraints should provide sub-linear long-term constraint violations, i.e., the time-averaged violations of the long-term constraints tend to zero as time approaches infinity.

Wireless network virtualization (WNV) as an extension of wired network virtualization to the wireless domain has been proposed to share a common network infrastructure among several virtual networks. In a virtualized wireless network, an infrastructure provider (InP) owns the network infrastructure and virtualizes the network resources into virtual slices. The service providers (SPs) lease these virtual slices and serve their subscribing users under their own management and requirements, without the need to be aware of the underlying physical network infrastructure. WNV reduces the capital and operational expenses of wireless networks and makes it easier and faster to migrate to new network technologies, while ensuring the existing services are unaffected. Different from wired network virtualization, WNV concerns the sharing of both the wireless infrastructure and the radio spectrum. Due to the broadcast and random nature of the wireless medium, spectrum sharing in WNV brings new challenges in guaranteeing the isolation of virtual networks.

Existing works on OCO with long-term constraints use the standard per-time-slot settings, where the decision is made in each time slot and the convex loss function is revealed at the end of each time slot. OCO with long-term constraints has been considered in which a saddle point algorithm was proposed to achieve lower computational complexity than another known method and provides $O(\sqrt{T})$ regret and $O(T^{(3/4)})$ long-term constraint violation. A trade-off between the regret and the long-term constraint violation has been shown in a follow-up work. Variations of the online saddle point methods have been studied for distributed online problems with consensus and proximity constraints. A virtual-queue-based algorithm has been proposed and provides $O(\sqrt{T})$ regret and $O(1)$ long-term constraint violation. The above works consider time-invariant constraints that are known in advance. Virtual-queue-based OCO algorithms have been proposed for time-varying constraints with static and dynamic regret analysis. A modified online saddle point algorithm has been proposed to deal with time-varying constraints. However, many practical systems do not allow a decision to be made at each time slot, while the system itself evolves over time.

While the known methods assume that all convex loss function feedbacks are delayed for one time slot, there are existing works on OCO with multiple-time-slot or adversarial feedback delays. However, all of these works assume decisions are made at each time slot. Algorithms dealing with a known fixed feedback delay have been studied. The standard online gradient descent algorithm has been extended to deal with a known fixed feedback delay. A delay-adaptive online gradient descent algorithm has been proposed to accommodate adversarial feedback delays, under the assumption that the feedback delays do not change the order of the received feedbacks. A unified framework has been proposed to extend the standard OCO algorithms with full-information feedbacks to handle adversarial feedback delays. Regret bound analysis of online gradient descent algorithm with adversarial feedback delays has been provided.

Inherited from wired network virtualization, most existing MIMO WNV works enforce strict physical isolation. The system throughput and energy efficiency maximization problems have been studied for WNV in orthogonal frequency division multiplexing (OFDM) massive MIMO systems. The cloud radio networks (C-RAN) and non-orthogonal multiple access (NOMA) techniques have been combined with uplink MIMO WNV in some known methods. Exclusive sub-channels are allocated to each SP through a two-level hierarchical auction architecture and antennas are allocated through pricing among the SPs for virtualized massive MIMO systems in some known works. The physical isolation approach does not fully utilize the benefit of spatial spectrum sharing enabled by MIMO beamforming. In contrast, all antennas and channel resources are shared among the SPs in some works, through stochastic robust precoding for massive MIMO WNV.

Although the above MIMO WNV works focus on offline problems, the Lyapunov optimization technique and OCO technique have been utilized in various online studies for non-virtualized MIMO systems. Under the framework of Lyapunov optimization, online power control for wireless transmission with energy harvesting and dynamic transmit covariance design for point-to-point MIMO systems have been studied. Online projected gradient descent and matrix exponential learning have been used for MIMO uplink covariance matrix design. Online MIMO WNV schemes under accurate and inaccurate CSI have been studied without considering channel sate feedback delay. Furthermore, known methods all are under the standard per-time-slot settings.

Under standard OCO settings, decision making and convex loss function feedback are in a strict per-time-slot fashion, which is restrictive for many real applications. In a practical long term evolution (LTE) network, there is only one reference or pilot symbol inserted in every six or seven transmission symbols to allow channel estimation. MIMO precoding relies on channel state feedback and is designed every six or seven symbol durations, while the underlying channel state keeps varying over those symbol durations. Existing OCO algorithms cannot be directly applied to such a system, where decisions and system states are updated per period that could last for multiple time slots.

SUMMARY

Some embodiments advantageously provide a method and system for online convex optimization with periodic updates for downlink multi-cell multiple input multiple output (MIMO) wireless network virtualization.

An OCO algorithm with periodic updates is provided. The algorithm is applied to an online downlink multi-cell MIMO WNV problem, where precoding design and channel state feedback are in a per-update-period fashion.

Also provided is a way to apply the OCO algorithm to wireless network virtualization (WNV) in the downlink coordinated multi-cell setting. In some embodiments, in the most general setting, an agent makes a decision, taken from a known convex decision space, at the beginning of each update period that can last for multiple time slots. The gradient or sub-gradient information of some convex loss functions is then revealed to the agent at the end of each update period. The convex loss function can change arbitrarily at each time slot with unknown statistics. The gradient or sub-gradient feedbacks may be delayed for multiple time slots, received out of order, and partly missing within each update period. The sequence of decisions is subject to both long-term and short-term constraints. Based only on the past gradient or sub-gradient information, the agent makes a sequence of decisions to provide updates to sub-linear regret and long-term constraint violation parameters.

In contrast to known methods, some embodiments of the algorithm allow gradient or sub-gradient feedbacks to be delayed for multiple time slots, received out of order and partly missing within each update period, while a decision is made only at the beginning of each update period.

In some embodiments, SPs are allowed to share all antennas and wireless spectrum resources simultaneously through the spatial virtualization approach.

In some embodiments, an online downlink coordinated multi-cell MIMO WNV algorithm is provided, where under the general setting a precoding design and channel state feedback are in a per-update-period fashion which, for example, is used in standard Long-Term Evolution (LTE).

In some embodiments, the OCO algorithm is implemented to design an online coordinated multi-cell precoding scheme at the infrastructure provider (InP) for downlink MIMO WNV, in which the wireless network is comprised of multiple service providers (SP) with unknown channel distribution information (CDI) and delayed channel state information (CSI). In the WNV framework discussed herein, in some embodiments, the InP communicates the corresponding channel state to each service provider (SP) after obtaining the global channel state. Each SP is allowed to utilize all antennas and wireless spectrum resources provided by the InP and design its own virtual precoding matrix in each cell, without the need to be aware of its own users in other cells and the users of other SPs. In some embodiments, at the beginning of each demand-response period, the InP coordinates the cells at the precoding level to meet the current and future virtualization demands from the SPs, based only on the past channel states and virtual precoding matrices. The InP aims to minimize the accumulated precoding deviation from the virtualization demand, accommodating both long-term and short-term transmit power constraints.

An OCO algorithm with periodic updates is described below. The OCO algorithm makes a decision at the beginning of each update period that can last for multiple time slots. The convex loss function can change arbitrarily at each time slot with unknown statistics. The gradient or sub-gradient feedbacks of the convex loss functions are allowed to be delayed for multiple time slots, received out of order, and partly missing within each update period. A sequence of decisions is made based only on the past gradient or sub-gradient information, subject to both long-term and short-term constraints. In some embodiments, the OCO algorithm provides $O(\sqrt{T})$ regret defined with partial feedbacks and $O(1)$ long-term constraint violation.

An online downlink coordinated multi-cell MIMO WNV algorithm, with unknown CDI and delayed CSI under standard LTE transmission frame settings is disclosed. In the WNV framework, the InP may communicate the corresponding channel state to each SP after receiving the global channel state feedback. Each SP is allowed to utilize all antennas and wireless spectrum resources and design its own virtual precoding matrix in each cell, without the need to be aware of its own users in other cells and the other SPs. At the beginning of each demand-response period, in some embodiments, the InP coordinates the cells at the precoding level to meet the current and future virtualization demands based on the past channel states and virtual precoding matrices. In some embodiments, the InP optimizes MIMO precoding to minimize the accumulated precoding deviation from the virtualization demand, accommodating both long-term and short-term transmit power constraints. In such a case, the online coordinated multi-cell precoding problem has a distributed closed-form solution with low computational complexity.

Extensive simulation studies have been performed to validate the performance of the proposed online downlink coordinated multi-cell MIMO WNV algorithm under standard LTE network settings. Simulation studies show a fast convergence of time-averaged performance. The algorithm is able to track channel variations and is applicable to massive MIMO. Comparisons with an optimal offline fixed precoding strategy and OCO algorithm with long-term constraints under the standard settings demonstrate system performance advantage of the method proposed herein. Performance studies under different demand-response periods, precoding strategies adopted by the SPs, long-term transmit power limits, numbers of cells and antennas, and per-antenna transmit power constraints are also provided.

According to one aspect, a method of online coordinated multi-cell precoding for a network node configurable at least in part by an infrastructure provider is provided. The network node is configured to facilitate sharing of wireless network infrastructure resources by a plurality of service providers. The method includes obtaining a global channel state, the global channel state being based at least in part on a channel state in each cell of a plurality of cells and communicating a channel state to a corresponding service provider. The method also includes receiving a virtual precoding matrix from each service provider of the plurality of services providers, each virtual precoding matrix being based at least in part on the channel state communicated to the corresponding service provider and being further based at least in part on a condition that each service provider of the plurality of services providers is allowed to use all of a plurality of available antennas and available wireless spectrum resources. The method further includes executing an optimization procedure to periodically determine a multiple input multiple output, MIMO, precoding matrix that minimizes an accumulated precoding deviation from a virtualization demand subject to constraints, the virtualization demand and the MIMO precoding matrix being based at least in part on the virtual precoding matrices received from the plurality of service providers. The method includes applying the determined MIMO precoding matrix to signals applied to the plurality of available antennas to achieve a sum of throughputs for the plurality of service providers that is greater than a sum of the throughputs for the plurality of service providers achievable when the virtual precoder matrices are applied to the signals.

According to this aspect, in some embodiments, the optimization procedure includes periodically determining a gradient of a convex loss function and providing the determined gradient as feedback to the determination of the MIMO precoding matrix. In some embodiments, feedback in the optimization procedure is allowed to be delayed for multiple time slots, received out of order and/or partly missing within an update period. In some embodiments, the optimization procedure includes an online projected gradient ascent algorithm that provides $O(\sqrt{T})$ regret and $O(1)$ long term constraint violation, where T is a total time horizon over which multiple updates of the determined MIMO precoding matrix occur. In some embodiments, the accumulated precoding deviation is determined according to $\sum_{t \in \mathcal{T}} f_t(x_t)$ where T is a time horizon, $x_t$ is a decision in a sequence of decisions made by the network node, $f_t(x_t)$ is a convex loss function, $\sum_{t \in \mathcal{T}} f_t(x_t)$ is an accumulated loss and $x^o \triangleq \arg\min_{x \in X_0} \sum_{t \in \mathcal{T}} f_t(x)$ is the argument of $\sum_{t \in \mathcal{T}} f_t(x)$ that produces a minimum value of $\sum_{t \in \mathcal{T}} f_t(x)$. In some embodiments, the method further includes dividing a total time horizon T into update periods, each update period having a duration of $T_o$ time slots, $T_o$ being at least one time slot, and updating the MIMO precoding matrix at a beginning or end of each update period. In some embodiments, at a beginning of each update period, a decision is taken from a known convex decision space and a loss is determined by an end of the duration of $T_o$ time slots based at least in part on the decision, the loss being based at least in part on a convex loss function. In some embodiments, the virtualization demand is further based at least in part on past channel states. In some embodiments, the constraints include long term transmit power constraints and short term transmit power constraints. In some embodiments, the MIMO precoding matrix is determined to provide sub-linear T-slot regret with partial feedback on the accumulated precoding deviation from the virtualization demand, where T is a total time horizon.

According to another aspect, a network node configured for online coordinated multi-cell precoding, the network node configurable at least in part by an infrastructure provider is provided. The network node is configured to facilitate sharing of wireless network infrastructure resources by a plurality of service providers. The network node includes processing circuitry configured to: obtain a global channel state, the global channel state being based at least in part on a channel state in each cell of a plurality of cells and communicate a channel state to a corresponding service provider. The processing circuitry is further configured to receive a virtual precoding matrix from each service provider of the plurality of services providers, each virtual precoding matrix being based at least in part on the channel state communicated to the corresponding service provider and being further based at least in part on a condition that each service provider of the plurality of services providers is allowed to use all of a plurality of available antennas and available wireless spectrum resources. The processing circuitry is further configured to execute an optimization procedure to periodically determine a multiple input multiple output, MIMO, precoding matrix that minimizes an accumulated precoding deviation from a virtualization demand subject to constraints, the virtualization demand and the MIMO precoding matrix being based at least in part on the virtual precoding matrices received from the plurality of service providers. The processing circuitry is further configured to apply the determined MIMO precoding matrix to signals applied to the plurality of available antennas to achieve a sum of throughputs for plurality of service providers that is greater than a sum of the throughputs for the plurality of service providers achievable when the virtual precoder matrices are applied to the signals.

According to this aspect, in some embodiments, the optimization procedure includes periodically determining a gradient of a convex loss function and providing the determined gradient as feedback to the determination of the MIMO precoding matrix. In some embodiments, feedback in the optimization procedure is allowed to be delayed for multiple time slots, received out of order and/or partly missing within an update period. In some embodiments, the optimization procedure includes an online projected gradient ascent algorithm that provides $O(\sqrt{T})$ regret and $O(1)$ long term constraint violation, where T is a total time horizon over which multiple updates of the determined MIMO precoding matrix occur. In some embodiments, the accumulated precoding deviation is determined according to $\sum_{t \in \mathcal{T}} f_t(x_t)$ where T is a time horizon, $x_t$ is a decision in a sequence of decisions made by an agent, $f_t(x_t)$ is a convex loss function, $\sum_{t \in \mathcal{T}} f_t(x_t)$ is an accumulated loss and $x^o \triangleq \arg\min_{x \in X_0} \sum_{t \in \mathcal{T}} f_t(x)$ is the argument of $\sum_{t \in \mathcal{T}} f_t(x)$ that produces a minimum value of $\sum_{t \in \mathcal{T}} f_t(x)$. In some embodiments, the processing circuitry is further configured to divide a total time horizon T into update periods, each update period having a duration of $T_o$ time slots, $T_o$ being at least one timeslot, and updating the MIMO precoding matrix at a beginning or end of each update period. In some embodiments, at a beginning of each update period, a decision is taken from a known convex decision space and a loss is determined by an end of the duration of $T_o$ time slots based at least in part on the decision, the loss being based at least in part on a convex loss function. In some embodiments, the virtualization demand is further based at least in part on past channel states. In some embodiments, the constraints include long term transmit power constraints and short term transmit power constraints. In some embodiments, the MIMO precoding matrix is determined to provide sub-linear T-slot regret with partial feedback on the accumulated precoding deviation from the virtualization demand, where T is a total time horizon.

According to yet another aspect, a network node configured for sharing of wireless network resources among a plurality of service providers is provided. The network node includes processing circuitry configured to receive from each of the plurality of service providers a virtual precoder matrix determined by the corresponding service provider. The processing circuitry is further configured to determine a precoder matrix by minimizing a precoding deviation from a virtualization demand of the network subject to at least one power constraint, the virtualization demand being based at least in part on a product of a channel state matrix and a virtual precoder matrix. The processing circuitry is further configured to apply the determined precoder matrix to signals applied to a plurality of antennas to achieve a sum of throughputs for the plurality of service providers that is greater than a sum of throughputs for the plurality of service providers achievable when the virtual precoder matrices are applied to the signals.

According to this aspect, in some embodiments, determining the precoder matrix includes solving a minimization problem that includes determining a gradient of a convex loss function. In some embodiments, determining the precoder matrix includes decomposing the minimization problem into a number of subproblems, each subproblem involving a gradient of a convex loss function of a local precoding matrix. In some embodiments, the minimization problem includes comparing a function of the determined precoder matrix to an offline fixed precoding strategy. In some embodiments, the virtual precoder matrices received from the plurality of service providers are each based at least in part on a condition that each service provider is allowed to use all of a plurality of available antennas and wireless spectrum resources. In some embodiments, the precoding deviation from virtualization demand is determined at least in part by:

$$f_t(V) \triangleq \|H_t V - D_t\|_F^2$$

where V is a past precoding matrix, $H_t$ is the channel state and $D_t$ is the virtualization demand.

According to another aspect, a method of online coordinated multi-cell precoding for a network node configurable at least in part by an infrastructure provider is provided, where the network node is configured to facilitate sharing of wireless network infrastructure resources by a plurality of service providers. The method includes receiving from each of the plurality of service providers a virtual precoder matrix determined by the corresponding service provider. The method includes determining a precoder matrix by minimizing a precoding deviation from a virtualization demand of the network subject to at least one power constraint, the virtualization demand being based at least in part on a product of a channel state matrix and a virtual precoder matrix. The method also includes applying the determined precoder matrix to signals applied to a plurality of antennas to achieve a sum of throughputs for the plurality of service providers that is greater than a sum of throughputs for the plurality of service providers achievable when the virtual precoder matrices are applied to the signals.

According to this aspect, in some embodiments, determining the precoder matrix includes solving a minimization problem that includes determining a gradient of a convex loss function. In some embodiments, determining the precoder matrix includes decomposing the minimization problem into a number of subproblems, each subproblem involving a gradient of a convex loss function of a local precoding matrix. In some embodiments, the minimization problem includes comparing a function of the determined precoder matrix to an offline fixed precoding strategy. In some embodiments, the virtual precoder matrices received from the plurality of service providers are each based at least in part on a condition that each service provider is allowed to use all of a plurality of available antennas and wireless spectrum resources. In some embodiments, the precoding deviation from virtualization demand is determined at least in part by:

$$f_t(V) \triangleq \|H_t V - D_t\|_F^2$$

where V is a past precoding matrix, $H_t$ is the channel state and $D_t$ is the virtualization demand.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
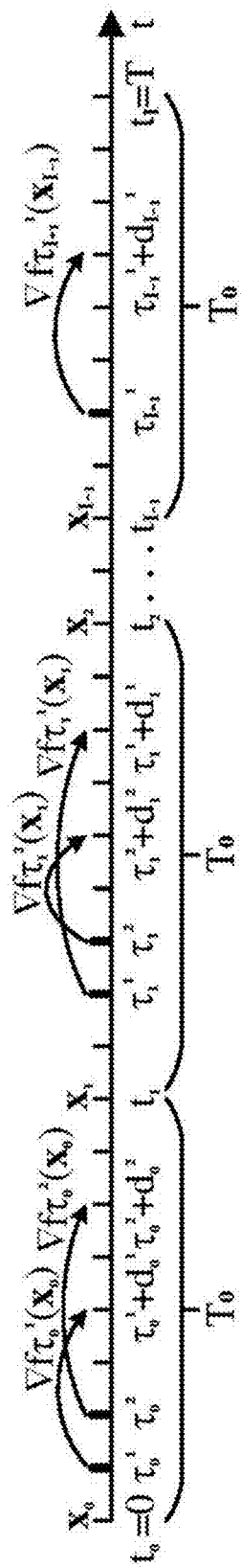
FIG. 1 shows periodic updates of an OCO algorithm.

Before describing in detail exemplary embodiments, it is noted that the embodiments reside primarily in combinations of apparatus components and processing steps related to online convex optimization with periodic updates for downlink multi-cell multiple input multiple output (MIMO) wireless network virtualization. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The term "network node" or "radio network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS) etc. The network node may also comprise test equipment. The term "radio node" used herein may be used to also denote a wireless device such as a WD or a radio network node.

A method and network node for online coordinated multi-cell precoding are provided. According to one aspect, a method includes receiving from each of the plurality of service providers a virtual precoder matrix determined by the corresponding service provider. The method also includes determining a precoder matrix by minimizing a precoding deviation from a virtualization demand of the network subject to at least one power constraint, the virtualization demand being based at least in part on a product of a channel state matrix and a virtual precoder matrix. The method further includes applying the determined precoder matrix to signals applied to a plurality of antennas to achieve a sum of throughputs for the plurality of service providers that is greater than a sum of throughputs for the plurality of service providers achievable when the virtual precoder matrices are applied to the signals.

Problem Formulation

In this subsection, a constrained OCO problem is formulated. Then, for a performance metric, a regret with partial feedback and long-term constraint violations is defined. Finally, an OCO algorithm with periodic updates is derived.

Under standard OCO settings, at the beginning of each time slot t, an agent makes a decision $x_t \in X_0$, where $X_0 \in \mathbb{R}^n$ is a known compact convex set. At the end of each time slot t, the system reveals the convex loss function $f_t(x): \mathbb{R}^n \mapsto \mathbb{R}$ to the agent, who then suffers a loss $f_t(x_t)$. A goal of an OCO algorithm is to select a sequence $\{x_t\}$ such that the accumulated loss $\sum_{t \in \mathcal{T}} f_t(x_t)$ is comparable with the one yielded by the optimal offline fixed strategy defined as $x^o \triangleq \arg\min_{x \in X_0} \sum_{t \in \mathcal{T}} f_t(x)$, with all convex loss functions known in hindsight, where $\mathcal{T} = \{0, \ldots, T-1\}$. A desired OCO algorithm should provide sub-linear regret defined as $\sum_{t \in \mathcal{T}} f_t(x_t) - f_t(x^o)$. With the assumption of bounded gradient or sub-gradient, it is known that the online projected gradient ascent algorithm provides $O(\sqrt{T})$ regret. Note that the compact convex set $X_0$ can be expressed as a set of short-term constraints, $\mathcal{g}_c(x_t) \leq 0$, where $\mathcal{g}_c(x_t): \mathbb{R}^n \mapsto \mathbb{R}$, $c \in \mathcal{C}$ with $\mathcal{C} = \{1, \ldots, C\}$.

The standard OCO formulation is useful in many applications. However, it does not accommodate long-term constraints. OCO with long-term constraints was formulated that does not require $\mathcal{g}_c(x_t) \leq 0$ to be satisfied at each time slot t, but only requires the long-term constraint violation, defined as $\sum_{t \in \mathcal{T}} \mathcal{g}_c(x_t)$, to grow sub-linearly. Recently, a virtual-queue-based OCO algorithm in provides $O(\sqrt{T})$ regret and $O(1)$ long-term constraint violation under the per-time-slot OCO settings.

Thus an OCO problem formulation with periodic updates as shown in FIG. 1 is provided. The total time horizon T is segmented into I update periods, indexed by the set $\mathcal{I} = \{0, \ldots, I-1\}$, each having a duration of $T_0 \geq 1$ time slots. At the beginning of each update period $i \in \mathcal{I}$, an agent is required to make a decision $x_i$ for the next $T_0$ time slots, from a known compact convex set $X_0$ that incorporates the short-term constraints. The variable $t_i$ denotes the first time slot of update period i. Let $f_t(x): \mathbb{R}^n \mapsto \mathbb{R}$ be a convex loss function at time slot t, which is determined by the system (e.g., sum rate of a wireless network determined by the wireless channel conditions). Within each update period i, the agent is sent feedback multiple times of the gradient or sub-gradient information $\nabla f_\tau(x_i)$ for $t_i \leq t < t_{i+1}$. Let $\mathcal{S}_i = \{1, \ldots, S_i\}$ be the index set of such feedback. Let $\tau_i^s$ denote the time slot when feedback s, $s \in S_i$ is sent. Then, at the end of time slot $\tau_i^s + d_i^s - 1$, $\nabla f_{\tau_i^s}(x_i)$ is revealed to the agent, where $d_i^s$ is the delay of the feedback at time slot $\tau_i^s$.

While the set $X_0$ accommodates short-term constraints, long-term constraints in may also be considered in the problem formulation. Let $g_c(x): \mathbb{R}^n \mapsto \mathbb{R}$, $c \in \mathcal{C}$ be the known convex long-term constraint function. The agent tries to enforce the long-term constraint $\sum_{i \in \mathcal{I}} T_0 g(x_i) \preceq 0$ over I periods, where $g(x) \triangleq [g_1(x), \ldots, g_c(x)]^T$ and $\preceq$ denotes element-by-element inequality.

In some embodiments, the following two conventional goals of an OCO algorithm, with slight modification for the system model are achieved. One goal of an OCO algorithm is to select a sequence $\{x_i\} \in X_0$, such that the accumulated loss is competitive with an optimal offline fixed strategy defined with partial feedback $$x_p^o \triangleq \arg\min_{x \in X} \sum_{i \in \mathcal{I}} \frac{T_0}{S_i} \sum_{s \in S_i} f_{\tau_i^s}(x),$$

where $X \triangleq \{x \in X_0: g(x) \preceq 0\}$. To capture this, define the regret with partial feedback as follows:

$$RE_p(T) \triangleq \frac{T_0}{S_i} \sum_{i \in \mathcal{I}} \sum_{s \in S_i} f_{\tau_i^s}(x_i) - f_{\tau_i^s}(x_p^o). \quad (1)$$

Another goal of an OCO algorithm is to provide sub-linear long-term constraint violation defined for any c as follows:

$$VO_c(T) \triangleq \sum_{i \in \mathcal{I}} T_0 g_c(x_i) \quad (2)$$

Note that the long-term constraints introduce correlation on the decisions over time, and lead to a more complicated online problem when the decision is fixed for one update period that lasts for multiple time slots, while the underlying system evolves over time.

Assume that each feedback $\nabla f_{\tau_i^s}(x_i)$, $s \in S_i$ is delayed for at least one time slot and received by the agent before it makes the next decision $x_{i+1}$, i.e., $1 \leq d_i^s \leq t_{i+1} - \tau_i^s \forall s \in S_i$, $\forall i \in \mathcal{I}$. Also assume that there is at least one feedback received by the agent within each update period, i.e., $1 \leq S_i$, $\forall i \in \mathcal{I}$. Note that the feedback within each update period is not assumed to be received in order, i.e., even if $r < s$, the following statement is not necessarily true: $\tau_i^r + d_i^r \leq \tau_i^s + d_i^s$, $\forall r, \in S_i$.

When the feedback received for the gradient or subgradient of the convex loss functions is incomplete, i.e., $\sum_{i \in \mathcal{I}} S_i < T$, it is unfair to compare the algorithm described herein with the standard optimal offline fixed strategy $x^o$ that knows all convex loss functions in hindsight. Let $\mathcal{T}_i = \{\tau_i^1, \ldots, \tau_i^{s_i}\}$ be the set of time slots with feedback and $\mathcal{F}_i = \{t: t_i \leq t < t_{i+1}\}$ be the set of time slots where decision $x_i$ is made. For the offline setting, assume the convex loss function at time slot $t \in \mathcal{F}_i \setminus \mathcal{T}_i$ is the average of the convex loss functions received within update period i, i.e., $$f_t(x) = \frac{1}{S_i} \sum_{s \in S_i} f_{\tau_i^s}(x), \forall t \in \mathcal{F}_i \setminus \mathcal{T}_i, \forall i \in \mathcal{J}.$$

As such, the OCO algorithm derived herein is compared with an optimal offline fixed strategy $x_p^o$ that has the same partial feedback information. Note that when all gradient or sub-gradient feedback for all time slots in each period are received, i.e., $S_i = T_0$, $\forall i \in \mathcal{J}$, $x_p^o$ becomes the standard optimal offline fixed strategy $x^o$.

OCO Algorithm with Periodic Updates

The OCO algorithm described herein with periodic updates is presented as Algorithm 1, summarized below. It selects a decision sequence $\{x_i\}$ and a virtual queue sequence $\{Q_i\}$, which can be viewed as the primal and dual variables in the saddle-point-typed OCO algorithms. The main difference is that Algorithm 1 uses the virtual queues as the dual variables to incorporate the violations of long-term constraints. The virtual queue sequence $\{Q_i\}$ serves as a queue backlog of the violations of long-term constraints, and an upper bound on the virtual queue vector can be readily translated to an upper bound on the long-term constraint violations. It has been shown that a virtual-queue-based algorithm has some advantages over the saddle-point-typed algorithms regarding performance guarantees under the standard OCO settings.

In some embodiments, algorithm 1 may be summarized as follows:

A. Let $\gamma$, $\alpha > 0$ be constant algorithm parameters. At the beginning of period i=0, initialize $Q_0 \triangleq [Q_0^1, \ldots, Q_0^C]^T = 0$ and $x_0 \in X_0$. By the end of period 0, receive $\nabla f_{\tau_0^s}(x_0)$, $s \in S_0$.

B. If i+1≥I, then End.

C. If i+1≤I, then:

D. At the beginning of each i+1-st update period $t_{i+1}$, use $\nabla f_{\tau_i^s}(x_i)$, $s \in S_i$ to do the following:
Update the virtual queue for all $c \in C$ $$Q_{i+1}^c = \max\{-T_0 \tilde{g}_c(x_i), Q_i^c + T_0 \tilde{g}_c(x_i)\} \quad (3)$$

where $\tilde{g}_c(x_i) \triangleq \gamma g_c(x_i)$.

E. Solve P1 for $x_{i+1}$ as $$P1: \min_{x \in X} \frac{T_0}{S_i} \sum_{s \in S_i} \{\nabla f_{\tau_i^s}^T(x_i)(x - x_i)\} + \alpha \|x - x_i\|_2^2 +$$

$$[Q_{i+1} + T_0 \tilde{g}(x_i)]^T [T_0 \tilde{g}(x)] \text{ where } Q_{i+1} \triangleq [Q_{i+1}^1, \ldots, Q_{i+1}^C]^T,$$

$$\text{and } \tilde{g}(x) \triangleq [\tilde{g}_1(x), \ldots, \tilde{g}_C(x)]^T$$

F. By the end of period i+1, receive $\nabla f_{\tau_{i+1}^s}(x_{i+1})$, $s \in S_{i+1}$.

G. i=i+1.

H. Return to B.

The following assumptions, which are common in the OCO literature, are made to facilitate the regret and long-term constraint violation bound analysis of Algorithm 1.

Assumption 1. There exists a constant D>0 such that for any $x \in X_0$ and any $t \in T$, and $$\|\nabla f_t(x)\|_2 \leq D \quad (4)$$

Assumption 2. There exists a constant β>0 such that g(x) is Lipschitz continuous with modulus β for any x, $y \in X_0$ as $$\|g(x) - g(y)\|_2 \leq \beta \|x - y\|_2 \quad (5)$$

Assumption 3. There exists a constant G>0 such that for any $x \in X_0$, and $$\|g(x)\|_2 \leq G \quad (6)$$

Assumption 4. There exists a constant R>0 such that for any x, $y \in X_0$, and $$\|x - y\|_2 \leq R \quad (7)$$

Assumption 5. There exists a constant $\epsilon > 0$ and a $\hat{x} \in X_0$ such for any $c \in \mathcal{C}$, and $$g_c(\hat{x}) \leq -\epsilon \quad (8)$$

Assumptions 1 and 2 are the standard assumptions of bounded gradient or sub-gradient for the convex loss functions and the Lipschitz continuity assumption for long-term constraints. Assumptions 3 and 4 bound the outputs of the long-term constraint functions and the decision set. Assumption 5 states that there is at least one interior point for any of the long-term constraint functions.

Note that the disclosed OCO formulation and Algorithm 1 account for the impact of multiple-time-slot update period on the regret bound and long-term constraint violation bound, which has not been studied in the literature before. Compared with the virtual-queue-based OCO algorithm under standard OCO settings, Algorithm 1 only uses the gradient or sub-gradient information instead of the loss function information. Furthermore, when the long-term and short-term constraint functions are separable with respect to blocks of x, P1 in Algorithm 1 can be equivalently decomposed into several sub-problems, each corresponding to a block of $x_{i+1}$ and can be solved with lower computational complexity.

Performance Analysis

In this subsection, performance bounds are provided for the OCO algorithm described herein. Impacts of the update period on the regret and long-term constraint violation bounds are explicitly analyzed.

First, bounds are provided on the virtual queues in the following lemma.

Lemma 1. The virtual queues are bounded for any $i \in \mathcal{I}$ and any $c \in \mathcal{C}$ as follows $$Q_i^c \geq 0, \quad (9)$$

$$Q_{i+1}^c + T_0 \tilde{g}_c(x_i) \geq 0, \quad (10)$$

$$\|Q_{i+1}\|_2^2 \geq \|T_0 \tilde{g}_c(x_i)\|_2^2, \quad (11)$$

$$\|Q_{i+1}\|_2 \leq \|Q_i\|_2 + \|T_0 \tilde{g}_c(x_i)\|_2 \quad (12)$$

Define $$L_i \triangleq \frac{1}{2}\|Q_i\|_2^2$$

as the quadratic Lyapunov function and $\Delta_i \triangleq L_{i+1} - L_i$ as the corresponding Lyapunov drift. Leveraging results in Lemma 1, an upper bound on the Lyapunov drift is provided in the following lemma.

Lemma 2. The Lyapunov drift $\Delta_i$ at each update period i∈ $\mathcal{I}$ is upper bounded by $$\Delta_i \leq Q_i^T[T_0 \tilde{g}(x_i)] + \|T_0 \tilde{g}(x_i)\|_2^2 \quad (13)$$

From the definition of strong convexity, function f(x) is said to be strongly convex on a convex set X∈ $\mathbb{R}^n$ with modulus α, if there exists a constant α>0 such that $$f(x) - \frac{\alpha}{2}\|x\|_2^2$$

is convex on X. Based on the properties of strongly convex functions, the following lemma is commonly used in the literature of OCO for regret analysis.

Lemma 3. Let X∈ $\mathbb{R}^n$ be a convex set. Let function f(x) be strongly convex on X with modulus α and $x_{opt}$ be a global minimum of f(x) on X. Then, for any x∈X:

$$f(x_{opt}) \leq f(x) - \frac{\alpha}{2}\|x_{opt} - x\|_2^2.$$

Leveraging results in Lemmas 1-3 and OCO techniques, the following theorem provides regret bounds for Algorithm 1.

Theorem 4. If $$\gamma = T^{\frac{1}{4}}, \text{ and } \alpha = \frac{1}{2}(T_0 + T_0^2 \beta^2)\sqrt{T}$$

in Algorithm 1, then for all I>0:

$$\mathrm{RE}_p(T) \leq \frac{D^2 + (T_0 + T_0^2 \beta^2)R^2 + T_0^2 G^2}{2}\sqrt{T} = O(\sqrt{T}). \quad (14)$$

Next, an upper bound on the long-term constraint violation in (2) is provided for Algorithm 1. The virtual queue is related to the long-term constraint violation in the following lemma.

Lemma 5. For the virtual queue $Q_i$ produced by Algorithm 1, for any c∈ $\mathcal{C}$ $$VO_c(T) \leq \frac{1}{\gamma} Q_i^c. \quad (15)$$

From Lemma 5, the long-term constraint violation $VO_c(T)$ can be bound through an upper bound on the virtual queue $Q_i^c$. The following theorem provides an upper bound on the long-term constraint violation over any given I>0 update periods.

Theorem 6. If $$\gamma = T^{\frac{1}{4}}, \text{ and } \alpha = \frac{1}{2}(T_0 + T_0^2 \beta^2)\sqrt{T}$$

in Algorithm 1, then for all I>0 and any c∈ $\mathcal{C}$:

$$VO_c(T) \leq 2T_0 G + \frac{2DR + (1 + T_0 \beta^2)R^2 + 4T_0 G^2}{2\epsilon} = O(1). \quad (16)$$

Theorems 4 and 6 show that Algorithm 1 provides $O(\sqrt{T})$ regret defined with partial feedback in (1) and O(1) long-term constraint violation in (2). Performance analysis explicitly considers the impacts of periodic updates on the performance guarantees of OCO, which has not been studied in the literature before. The above results can be extended to a more general system model with time-varying update periods and unknown time horizon. This is explained in the following remarks.

Define the variation of update period as $V_T = \Sigma_{i \in \mathcal{I}} (T_i - T_{i+1})^2$, where $T_i$ is the i-th update period. Under the assumptions that $T_i \leq T_{max}$, ∀i∈ $\mathcal{I}$ and $V_T \leq O(1)$, i.e., both the update period and the variation of update period are upper bounded, it can be shown that Algorithm 1 still yields $O(\sqrt{T})$ regret and O(1) long-term constraint violation.

The parameters γ and α in Algorithm 1 depend on the time horizon T. When T is unknown, the standard doubling trick can be applied to preserve the $O(\sqrt{T})$ regret bound of Algorithm 1 when T is known. It can be easily shown that applying the doubling trick to Algorithm 1 yields $O(\log_2 T)$ long-term constraint violation.

Online Multi-Cell MIMO WNV

In this subsection, an online coordinated multi-cell precoding problem for downlink MIMO WNV with unknown CDI and delayed CSI is disclosed. Both long-term and short-term transmit power constraints are accommodated in the formulation. Leveraging the OCO algorithm described herein, an online downlink coordinated multi-cell MIMO WNV algorithm is disclosed, with a distributed closed-form precoding solution and guaranteed performance bounds.

Idealized MIMO WNV Model

In the system under consideration, an InP performs WNV to a MIMO cellular network that consists of C cells, each cell c∈ $\mathcal{C}$ has one BS equipped with $N_c$ antennas, for a total of $N = \Sigma_{c \in \mathcal{C}} N_c$ antennas in the network. The InP serves M SPs, each SP m∈ $\mathcal{M}$ has $K_c^m$ users, for a total of $K_c = \Sigma_{m \in \mathcal{M}} K_c^m$ users in cell c and a total of $K = \Sigma_{c \in \mathcal{C}} K_c$ users in the network. Let $\mathcal{C} = \{1, \ldots, C\}$, $\mathcal{M} = \{1, \ldots, M\}$ and $\mathcal{K} = \{1, \ldots, K\}$. Consider a time-slotted system with time indexed by t, and denote $\hat{H}_t^{lcm} \in \mathbb{C}^{K_l^m \times N_c}$ as the local channel state between the $K_l^m$ users of SP m in cell l and the BS in cell c at time slot t.

Figure 2:
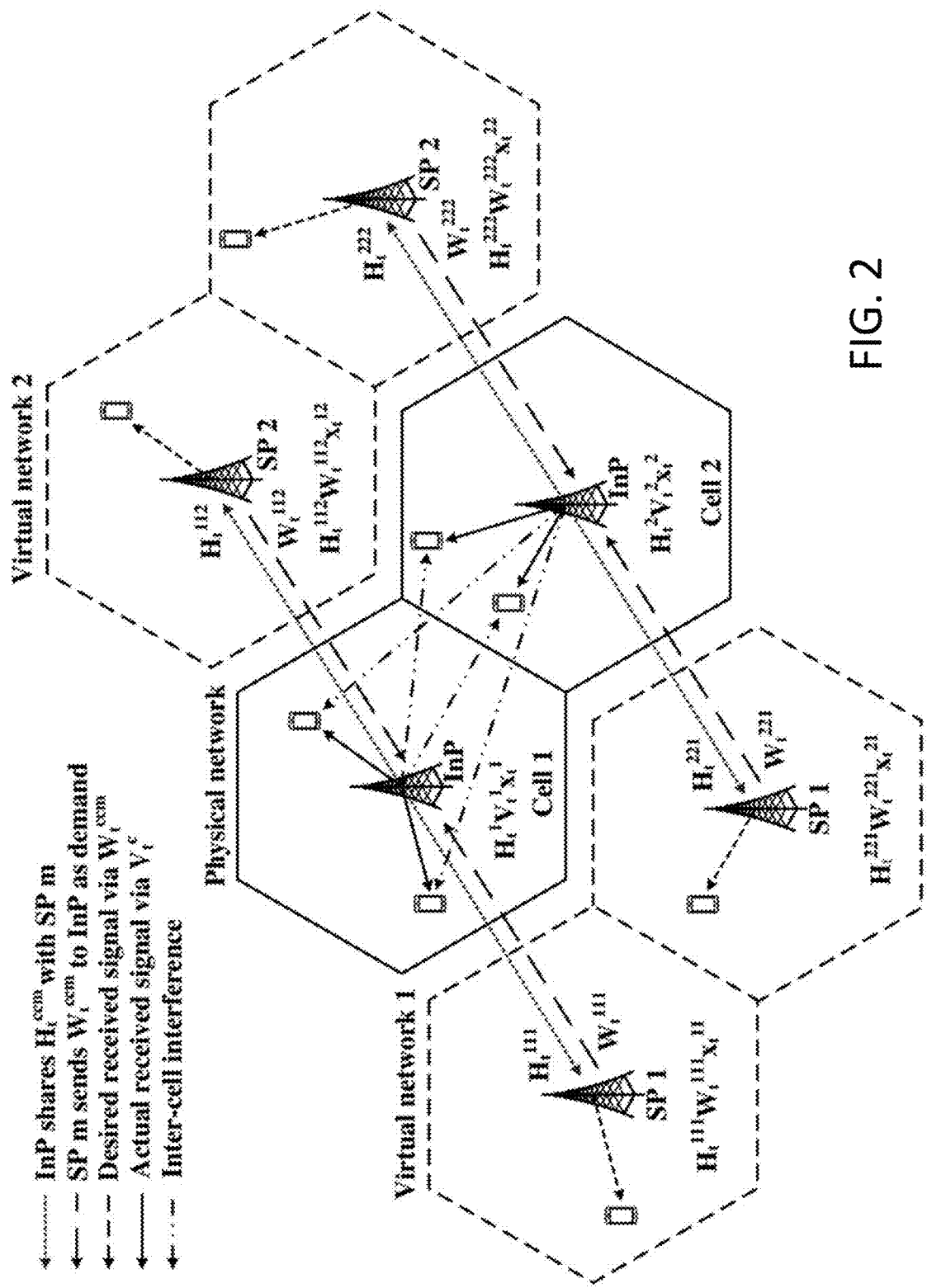
FIG. 2 shows virtual networks.

For ease of exposition, first consider an idealized WNV framework, with channel state feedback in each time slot without channel state feedback delay, as shown in FIG. 2, where the double arrowed lines extending from SP1 to SP2 indicating sharing between these two SPs. At each time slot t, in each cell c, the InP shares the corresponding channel state $\hat{H}_t^{ccm} \in \mathbb{C}^{K_c^m \times N_c}$ with SP m, and allocates transmit power $P_c^m$ to the SP, such that $\sum_{m \in \mathcal{M}} P_c^m \leq P_{max}^c$ with $P_{max}^c$ being the maximum transmit power limit of cell c. Each SP m designs its own precoding matrix $\hat{W}_t^{ccm} \in \mathbb{C}^{N_c \times K_c^m}$ based on the service needs of its subscribing users, subject to the transmit power limit $\|\hat{W}_t^{ccm}\|_F^2 \leq P_c^m$, and then sends this matrix to the InP as a virtual precoding matrix. Note that each SP m designs $\hat{W}_t^{ccm}$ without the need to be aware of its own users in the other cells and the other SPs. With the virtual precoding matrices designed by the SPs, the desired received signal vector (noiseless) for all $K_c$ users in cell c is $$\tilde{y}_t^c = \tilde{D}_t^c x_t^c$$

where $\tilde{D}_t^c \triangleq \text{blkdiag}\{\overline{D}_t^{c1}, \ldots, \overline{D}_t^{cM}\}$ is the virtualization demand from cell c with $\overline{D}_t^{cm} \triangleq \hat{H}_t^{ccm} \hat{W}_t^{ccm}$ being the virtualization demand from SP m in cell c, and $x_t^c = [x_t^{c1H}, \ldots, x_t^{cMH}]^H$ is the transmitted signal vectors for the $K_c$ users in cell c, with $x_t^{cm}$ being the transmitted signal vector for the $K_c^m$ users of SP m in cell c. The desired received signal vector at all K users in the network is $$y'_t = D_t x_t$$

where $D_t \triangleq \text{blkdiag}\{\tilde{D}_t^1, \ldots, \tilde{D}_t^c\}$ is the virtualization demand from the network, $x_t = [x_t^{1H}, \ldots, x_t^{CH}]^H$, and $y'_t = [\tilde{y}_t^{cH}]^H$. Without loss of generality, assume the transmitted signal to each user is zero-mean with unit power and uncorrelated to each other at each time slot t, i.e., $\mathbb{E}\{x_t\} = 0$ and $\mathbb{E}\{x_t x_t^H\} = I, \forall t \in \mathcal{T}$.

The InP coordinates the cells at the precoding level to serve all the users directly. In each cell c, with local channel state $\tilde{H}_t^c = [\overline{H}_t^{1cH}, \ldots, \overline{H}_t^{CcH}]^H \in \mathbb{C}^{K \times N_c}$, the InP designs the actual downlink precoding matrix $\tilde{V}_t^c \in \mathbb{C}^{N_c \times K_c}$ to serve the $K_c$ users in cell c, where $\overline{H}_t^{lc} = [\hat{H}_t^{lc1H}, \ldots, \hat{H}_t^{lcMH}]^H \in \mathbb{C}^{K_l \times N_c}$ is the channel state between the $K_l$ users in cell l and the BS in cell c. The actual received signal vector at all K users (for now without considering noise) is $$y_t = H_t V_t x_t$$

where $H_t = [\tilde{H}_t^1, \ldots, \tilde{H}_t^C] \in \mathbb{C}^{K \times N}$ is the global channel state, and $V_t = \text{blkdiag}\{\tilde{V}_t^1, \ldots, \tilde{V}_t^C\} \in \mathbb{C}^{N \times K}$ is the global precoding matrix designed by the InP. The expected deviation of the received signal vector at all K users via the InP's actual global precoding matrix from that via the SPs' local virtual precoding matrices is given by $$\mathbb{E}\{\|y_t - y'_t\|_2^2\} = \mathbb{E}\{\|H_t V_t - D_t\|_F^2\}$$

where $\|\cdot\|_F$ represents the Frobenius norm.

Problem Formulation

Define the convex set for InP's global precoding matrix $V \in \mathbb{C}^{N \times K}$ as $\mathcal{V}_0 \triangleq \{V = \text{blkdiag}\{\tilde{V}^1, \ldots, \tilde{V}^C\} : \|\tilde{V}^c\|_F^2 \leq P_{max}^c, \forall c \in \mathcal{C}\}$, where $\tilde{V}^c \in \mathbb{C}^{N_c \times K_c}$ is the local precoding matrix for cell c. Define the precoding deviation from virtualization demand of the network as $$f_t(V) \triangleq \|H_t V - D_t\|_F^2 = \sum_{c \in \mathcal{C}} \left\{ \|\overline{H}_t^{cc} \tilde{V}^c - \tilde{D}_t^c\|_F^2 + \sum_{l \in \mathcal{C}, l \neq c} \|\overline{H}_t^{lc} \tilde{V}^c\|_F^2 \right\} \quad (17)$$

where the first term is the precoding deviation from virtualization demand of cell c, and the second term is the leakage from cell c to all the other cells. Define the long-term transmit power constraint function for cell $c \in \mathcal{C}$ as $$g_c(\tilde{V}^c) \triangleq \|\tilde{V}^c\|_F^2 - \overline{P}_c \quad (18)$$

where $\overline{P}_c \leq P_{max}^c$ is the long-term transmit power limit set by the InP. The InP coordinates the cells at the precoding level to minimize the accumulated precoding deviation from the virtualization demand, subject to both long-term and short-term transmit power constraints.

Consider a periodic demand-response mechanism between the InP and the SPs. At the beginning of each time slot $t_i = iT_0$, $i \in \mathcal{I}$, the InP coordinates the C cells at the precoding level and designs a fixed global precoding matrix $V_i \in \mathbb{C}^{N \times K}$ for the next $T_0$ time slots. The InP then schedules channel state feedback to itself (with any channel estimation and feedback transmission method) at time slot $\tau_i^s$, $s \in \mathcal{S}_i$, and receives the global channel state $H_{\tau_i^s}$ at the end of time slot $\tau_i^s + d_i^s - 1$, where $d_i^s$ is the channel state feedback delay that satisfies $1 \leq d_i^s \leq t_{i+1} - \tau_i^s$. The InP is allowed to schedule partial channel state feedbacks within each demand-response period, i.e., $1 \leq S_i \leq T_0$, $\forall i \in \mathcal{I}$. In each cell c, the InP shares $\hat{H}_{\tau_i^s}^{ccm}$ with SP m, who then designs its own precoding matrix $\hat{W}_{\tau_i^s}^{ccm}$ on the fly and sends it to the InP before it designs the next global precoding matrix $V_{i+1}$.

The InP designs $\{V_i\} \in \mathcal{V}_0$ to provide sub-linear T-slot regret defined with partial feedback on the precoding deviation from the virtualization demand $$RE_p(T) \triangleq \sum_{i \in \mathcal{I}} \frac{T_0}{S_i} \sum_{s \in \mathcal{S}_i} f_{\tau_i^s}(V_i) - f_{\tau_i^s}(V_p^o) \text{ where } V_p^o \triangleq \quad (19)$$

$$\text{argmin}_{V \in \mathcal{V}} \sum_{i \in \mathcal{I}} \frac{T_0}{S_i} \sum_{s \in \mathcal{S}_i} f_{\tau_i^s}(V)$$

is the optimal offline fixed precoding strategy with partial feedbacks, and $\mathcal{V} \triangleq \{V = \text{diag}\{\tilde{V}^1, \ldots, \tilde{V}^c\} : \|\tilde{V}^c\|_F^2 \leq \overline{P}_c, \forall c \in \mathcal{C}\}$. Note that when all the channel state feedbacks are received by the InP, (19) becomes the standard regret definition in the literature of OCO. Another goal of the InP is to provide sub-linear long-term constraint violation on the long-term transmit power defined for any $c \in \mathcal{C}$ as $$VO_c(T) \triangleq \sum_{i \in \mathcal{I}} T_0 g_c(\tilde{V}_i^c) \quad (20)$$

Online Downlink Coordinated Multi-Cell MIMO WNV Algorithm

The OCO algorithm described herein provides a solution to the afore-mentioned online coordinated multi-cell precoding problem for downlink MIMO WNV. From the first-order condition of a real-valued scalar convex function with respect to the complex-valued matrix variable, for any V, $V_i \in \mathcal{V}_0$ $$f_t(V) \geq f_t(V_i) + 2\text{Re}\{\text{tr}\{\nabla_{V_i^*} f_t^H(V_i)(V - V_i)\}\} \quad (21)$$

where $\nabla_{V_i^*} f_t(V_i) = H_t^H(H_t V_i - D_t)$ is the partial derivative of $f_t(V_i)$ with respect to $V_i^*$ (the complex conjugate of $V_i$).

Leveraging the OCO algorithm described herein, at the beginning of each demand-response period $t_{i+1}$, the InP solves P2 for the global precoding matrix $V_{i+1}$ as follows:

$$P2: \min_{V \in \mathcal{V}_0} \frac{T_0}{S_i} \sum_{s \in \mathcal{S}_i} 2\text{Re}\left\{ tr\left\{ \nabla_{V_i^*} f_{\tau_i^s}^H(V_i)(V - V_i) \right\} \right\} +$$

$$\alpha \|V - V_i\|_F^2 + [Q_{i+1} + T_0 \tilde{g}(V_i)]^T [T_0 \tilde{g}(V)].$$

Since both the long-term and short-term transmit power constraints are on each cell, it then follows that P2 can be equivalently decomposed into C subproblems, each corresponding to the local precoding matrix $\tilde{V}_{i+1}^c$ for cell $c \in \mathcal{C}$ as follows:

$$P3: \min_{\tilde{V}^c} \frac{T_0}{S_i} \sum_{s \in S_i} 2\mathrm{Re}\left\{ tr\left\{ \nabla_{\tilde{V}_i^{c*}} f_{\tau_i^s}^H(V_i)(\tilde{V}^c - \tilde{V}_i^c) \right\} \right\} + \alpha \| \tilde{V}^c - \tilde{V}_i^c \|_F^2 + [Q_{i+1}^c + T_0 \tilde{g}_c(\tilde{V}_i^c)][T_0 \tilde{g}_c(\tilde{V}^c)] \text{ s.t. } \| \tilde{V}^c \|_F^2 - P_{max}^c \leq 0 \text{ where } \nabla_{\tilde{V}_i^{c*}} f_{\tau_i^s}(V_i) = \tilde{H}_{\tau_i^s}^{cH}\left(\tilde{H}_{\tau_i^s}^c \tilde{V}_i^c - \tilde{D}_{\tau_i^s}^{c'}\right),$$

$$\text{and } \tilde{D}_{\tau_i^s}^{c'} = \left[ 0, \ldots, D_{\tau_i^s}^{cH}, \ldots, 0 \right]^H.$$

(22)

P3 is a convex optimization problem satisfying the Slater's condition, thus strong duality holds. P3 can be solved by studying the Karush-Kuhn-Tucker (KKT) conditions. The Lagrange function for P3 is $$L(\tilde{V}^c, \lambda^c) = \frac{T_0}{S_i} \sum_{s \in S_i} 2\mathrm{Re}\left\{ tr\left\{ \nabla_{\tilde{V}_i^{c*}} f_{\tau_i^s}^H(V_i)(\tilde{V}^c - \tilde{V}_i^c) \right\} \right\} + \alpha \| \tilde{V}^c - \tilde{V}_i^c \|_F^2 + [Q_{i+1}^c + T_0 \tilde{g}_c(\tilde{V}_i^c)][T_0 \tilde{g}_c(\tilde{V}^c)] + \lambda^c (\| \tilde{V}^c \|_F^2 - P_{max}^c)$$

where $\lambda^c$ is the Lagrangian multiplier associated with constraint (22). Taking partial derivative of $L(\tilde{V}^c, \lambda^c)$ with respect to $\tilde{V}^{c*}$:

$$\nabla_{\tilde{V}^{c*}} L(\tilde{V}^c, \lambda^c) = \frac{T_0}{S_i} \sum_{s \in S_i} \nabla_{\tilde{V}_i^{c*}} f_{\tau_i^s}(V_i) + \alpha(\tilde{V}^c - \tilde{V}_i^c) + [Q_{i+1}^c + T_0 \tilde{g}_c(\tilde{V}_i^c)] T_0 \gamma \tilde{V}^c + \lambda^c \tilde{V}^c.$$

The KKT conditions for $(\tilde{V}^{co}, \lambda^{co})$ being globally optimal are given by $$\tilde{V}^{co} = \frac{\alpha \tilde{V}_i^c - \frac{T_0}{S_i} \sum_{s \in S_i} \nabla_{\tilde{V}_i^{c*}} f_{\tau_i^s}(V_i)}{\alpha + [Q_{i+1}^c + T_0 \tilde{g}_c(\tilde{V}_i^c)] T_0 \gamma + \lambda^{co}},$$ (23)

$$\| \tilde{V}^{co} \|_F^2 - P_{max}^c \leq 0,$$ (24)

$$\lambda^{co} \geq 0,$$ (25)

$$\lambda^{co}(\| \tilde{V}^{co} \|_F^2 - P_{max}^c) = 0$$ (26)

where (23) follows by setting $\nabla_{\tilde{V}^{c*}} L(\tilde{V}^c, \lambda^c) = 0$. Consider the following cases.
1) $\lambda^{co} > 0$: From (23), there is a closed-form solution for $\tilde{V}^{co}$, by noting that $\lambda^{co} > 0$ serves as a power regularization factor such that $\| \tilde{V}^{co} \|_F^2 = P_{max}^c$.
2) $\lambda^{co} = 0$: From (23), a closed-form solution for $\tilde{V}^{co}$:

$$\tilde{V}^{co} = \frac{\alpha \tilde{V}_i^c - \frac{T_0}{S_i} \sum_{s \in S_i} \nabla_{\tilde{V}_i^{c*}} f_{\tau_i^s}(V_i)}{\alpha + [Q_{i+1}^c + T_0 \tilde{g}_c(\tilde{V}_i^c)] T_0 \gamma},$$ (27)

Equation (27) can be categorized into two subcases: 2.1) If $\tilde{V}^{co}$ in (27) satisfies (24), then it is the optimal solution. 2.2) If $\tilde{V}^{co}$ in (27) cannot satisfy (24), which means the condition in Case 2) does not hold in optimality, i.e., $\lambda^{co} > 0$, and the optimal solution is given by Case 1).

An online downlink coordinated multi-cell MIMO WNV algorithm in accordance with the present disclosure and referred to herein as algorithm 2, is summarized as follows:

A. For large T, set $$\gamma = T^{\frac{1}{4}} \text{ and } \alpha = \frac{1}{2}(T_0 + T_0^2 \beta^2) \sqrt{T};$$

For intermediate value of T, solve P4 for $\gamma$ and $\alpha$.
B. At the beginning of period i=0, initialize $Q_0^c = 0$ and $V_0 \in \mathcal{V}_0$. By the end of period 0, receive $H\tau_o^s$ and $D\tau_o^s$, $s \in \mathcal{S}_0$.
C. If, i+1≥I then end;
D. If, i+1≤I then:
E. At the beginning of each demand-response period i+1, use $H\tau_i^s$ and $D_{\tau_i^s}$, $s \in \mathcal{S}_i$ to do the following:
Update virtual queue for all $c \in \mathcal{C}$ $$Q_{i+1}^c = \max\{-T_0 \tilde{g}_c(\tilde{V}_i^c), Q_i^c + T_0 \tilde{g}_c(\tilde{V}_i^c)\}$$ (28)

where $\tilde{g}_c(\tilde{V}_i^c) \triangleq \gamma g_c(\tilde{V}_i^c)$.
Update $\tilde{V}_{i+1}^c$, $\forall c \in \mathcal{C}$ as $$\bullet \tilde{V}_{i+1}^c = \begin{cases} \tilde{x}_i^c, & \text{if } \| \tilde{x}_i^c \|_F^2 \leq P_{max}^c \\ \frac{\sqrt{P_{max}^c}}{\| \tilde{x}_i^c \|_F} \tilde{x}_i^c, & \text{else} \end{cases}$$

$$\bullet \text{where } \tilde{x}_i^c = \frac{\alpha \tilde{V}_i^c - \frac{T_0}{S_i} \sum_{s \in S_i} \tilde{H}_{\tau_i^s}^{cH}\left(\tilde{H}_{\tau_i^s}^c \tilde{V}_i^c - \tilde{D}_{\tau_i^s}^{c'}\right)}{\alpha + [Q_{i+1}^c + T_0 \tilde{g}_c(\tilde{V}_i^c)] T_0 \gamma}$$

F. By the end of period i+1, receive $H_{\tau_{i+1}^s}$ and $D_{\tau_{i+1}^s}$, $s \in \mathcal{S}_{i+1}$.
G. i=i+1
H. Return to C, Performance Analysis The following assumption is made that the channel gain is upper bounded for theoretical performance bound analysis.
Assumption 6. There exists a constant B>0 such that the channel gain is upper bounded for any $t \in \mathcal{T}$ as $$\| H_t \|_F \leq B.$$ (29)

The following lemma shows that Assumptions 1-5 hold for the formulated online downlink MIMO WNV problem.
Lemma 7. Under Assumption 6, the formulated online downlink MIMO WNV problem with decision set $\mathcal{V}_0$, loss function $f_t(V)$, and long-term constraint function $g_c(\tilde{V}^j)$, $c \in \mathcal{C}$, satisfies Assumptions 1-5, with constants D, β, G, R, ε given as follows:

$$D = 4B^2 \sqrt{\sum_{c \in C} P_{max}^c},$$ (30)

$$\beta = 2\sqrt{\max\{P_{max}^c, \forall c \in C\}},$$ (31)

$$G = \sqrt{\sum_{c \in C} \max\{\overline{P}_c^2, (P_{max}^c - \overline{P}_c)^2\}},$$ (32)

$$R = 2\sqrt{\sum_{c \in C} P_{max}^c},$$ (33)

$$\epsilon = \min\{\overline{P}_c, \forall c \in C\}.$$ (34)

Leveraging the results in Lemma 7, Theorem 4, and Theorem 6, the following Theorem shows that Algorithm 2 provides $O(\sqrt{T})$ regret on the precoding deviation from the virtualization demand and $O(1)$ long-term transmit power constraint violation.

Theorem 8. If $$\gamma = T^{\frac{1}{4}} \text{ and } \alpha = \frac{1}{2}(T_0 + T_0^2\beta^2)\sqrt{T},$$

Algorithm 2 yields an $O(\sqrt{T})$ upper bound given in (15) on the regret defined in (19) and an $O(1)$ upper bound given in (16) on the long-term constraint violation defined in (20), with constants D, β, G, R, ∈ given in Lemma 7.

Furthermore, three remarks regarding the algorithm parameter selection, the optimal offline fixed precoding strategy, and the short-term per-antenna transmit power constraints are provided below.

Algorithm 2 provides $O(\sqrt{T})$ regret and $O(1)$ long-term constraint violation from Theorem 8 for a large T. However, the constants hidden behind the $O(\sqrt{T})$ and $O(1)$ upper bounds can be relatively large for an intermediate value of T. The following problem can be solved to obtain the algorithm parameters γ and α that yield the best regret bound, subject to a constraint on the long-term constraint violation upper bound:

$$P4: \min_{\gamma>0, \alpha>0} \frac{D^2}{2}\sqrt{T} + \alpha R^2 + \frac{1}{2}T_0^2\gamma^2 G^2$$

$$\text{s.t. } 2T_0 G + \frac{T_0 DR + \alpha R^2 + 2T_0^2\gamma^2 G^2}{T_0\gamma^2\epsilon}$$

$$\leq \min\{P_{max}^c - \overline{P}_c, \forall c \in C\}\sqrt{T},$$

$$\frac{1}{2}(T_0\sqrt{T} + T_0^2\beta^2\gamma^2) \leq \alpha$$

where D, β, G, R, ∈ are given in Lemma 7. P4 is a geometric programming (GP) problem that can be easily solved by a standard convex program solver such as CVX.

Algorithm 2 provides an $O(\sqrt{T})$ regret compared with the optimal offline fixed precoding solution $V_p^o$ defined with the same partial feedbacks for fair comparison. However, for algorithm performance evaluation in Subsection 6.4, the performance of Algorithm 2 is compared with the one yielded by the standard optimal offline fixed strategy $V_{opt}^o$, that solves the following optimization problem with complete feedback $$P5: \min_{V_{opt}} \Sigma_{t \in \mathcal{T}} \|H_t V_{opt} - D_t\|_F^2$$

$$\text{s.t.} \|\tilde{V}_{opt}^c\|_F^2 \leq \overline{P}_c, \forall c \in C \quad (35)$$

where $V_{opt}$=blkdiag$\{\tilde{V}_{opt}^1, \ldots, \tilde{V}_{opt}^c\}$. Note that $V_{opt}^o$ is a more knowledgeable fixed off-line strategy than $V_p^o$. Since P5 is a convex optimization problem satisfying the Slater's condition, the strong duality holds. P5 can be solved by studying the KKT conditions. The Lagrange function for P5 is $$L(V_{opt},\lambda) = \Sigma_{t \in \mathcal{T}} \|H_t V_{opt} - D_t\|_F^2 + \Sigma_{c \in C} \lambda^c(\|\tilde{V}_{opt}^c\|_F^2 - \overline{P}_c)$$

where $\lambda^c$, $c \in C$ is the Lagrangian multiplier associated with constraint (35). Taking partial derivative of $L(V_{opt}, \lambda)$ with respect to $\tilde{V}_{opt}^{c*}$:

$$\nabla_{\tilde{V}_{opt}^{c*}} L(V_{opt},\lambda) = \Sigma_{t \in \mathcal{T}} \tilde{H}_t^{cH}(\tilde{H}_t^c \tilde{V}_{opt}^c - \tilde{D}_t^c) + \lambda^c \tilde{V}_{opt}^c$$

where $\tilde{D}_t^c = [0, \ldots, \tilde{D}_t^{cH}, \ldots, 0]^H$. The KKT conditions for $(\tilde{V}_{opt}^{co}, \lambda^{co})$, $c \in C$ being globally optimal are given by $$(A_c + \lambda^{co} I)\tilde{V}_{opt}^{co} = B_c \quad (36)$$

$$\|\tilde{V}_{opt}^{co}\|_F^2 - \overline{P}_c \leq 0 \quad (37)$$

$$\lambda^{co} \geq 0 \quad (38)$$

$$\lambda^{co}(\|\tilde{V}_{opt}^{co}\|_F^2 - \overline{P}_c) = 0 \quad (39)$$

where (36) follows by setting $\nabla_{\tilde{V}_{opt}^{co}} L(V_{opt}, \lambda) = 0$, $A_c = \Sigma_{t \in \mathcal{T}} \tilde{H}_t^{cH} \tilde{H}_t^c$ and $B_c = \Sigma_{t \in \mathcal{T}} \tilde{H}_t^{cH} \tilde{D}_t^c$. Consider the following cases.

1) $\lambda^{co} > 0$: From (36), $A_c + \lambda^{co} I > 0$, which implies that it is invertible, and:

$$\tilde{V}_{opt}^{co} = (A_c + \lambda^{co} I)^{-1} B_c \quad (40)$$

in which $\lambda^{co} > 0$ can be found by bisection search such that $\|(A_c + \lambda^{co} I)^{-1} B_c\|_F^2 = \overline{P}_c$.

2) $\lambda^{co} = 0$: From (36), the optimal solution must satisfy $$A_c \tilde{V}_{opt}^{co} = B_c \quad (41)$$

categorize (41) into two subcases: 2.1) If $A_c$ is a rank deficient matrix, there are infinitely many solutions for $\tilde{V}_{opt}^{co}$. $\tilde{V}_{opt}^{co}$ is chosen to minimize $\|\tilde{V}_{opt}^{co}\|_F^2$ subject to (41), which is an under-determined least-square problem with a closed-form solution:

$$\tilde{V}_{opt}^{co} = A_c^H (A_c A_c^H)^{-1} B_c \quad (42)$$

By (37), if $\|A_c^H (A_c A_c^H)^{-1} B_c\|_F^2 \leq \overline{P}_c$, then $\tilde{V}_{opt}^{co}$ in (42) is the optimal solution. 2.2) If $A_c$ is of full rank, there is a unique solution:

$$\tilde{V}_{opt}^{co} = A_c^{-1} B_c \quad (43)$$

Again, if $\|A_c^{-1} B_c\|_F^2 \leq \overline{P}_c$, then $\tilde{V}_{opt}^{co}$ in (43) is the optimal solution. For both subcases 2.1) and 2.2), $\tilde{V}_{opt}^{co}$ in (42) or (43) cannot satisfy (37), which means the condition in Case 2) does not hold in optimality, i.e., $\lambda^{co} > 0$, and the optimal solution is given by Case 1).

Short-term per-antenna transmit power constraints can be incorporated into the problem formulation, by redefining the convex decision set as $\mathcal{V}_0 \triangleq \{V = \text{blkdiag}\{\tilde{V}^1, \ldots, \tilde{V}^c\}: \|v^{cn}\|_F^2 \leq P_{max}^{cn}, \mathcal{N} \forall n \in C \}$, where $\tilde{V}^c = [v^{c1}, \ldots, v^{cN_c}]^H \in \mathbb{C}^{N_c \times K_c}$ is the precoding matrix for cell c, $v^{cn} \in \mathbb{C}^{K_c \times 1}$ is the precoding vector and $P_{max}^{cn}$ is the maximum transmit power limit for the n-th antenna in cell c. Leveraging the OCO algorithm described herein, the InP solves P6 to obtain $\tilde{V}_{i+1}^c$ as follows:

$$P6: \min_{\tilde{V}^c} \frac{T_0}{S_i} \sum_{s \in S_i} 2\text{Re}\{tr\{\nabla_{\tilde{V}_i^{c*}} f_{\tau_i^s}^H (V_i)(\tilde{V}^c - \tilde{V}_i^c)\}\} + \alpha\|\tilde{V}^c - \tilde{V}_i^c\|_F^2 \quad (44)$$

$$+ [Q_{i+1}^c + T_0 \tilde{g}_c(\tilde{V}_i^c)][T_0 \tilde{g}_c(\tilde{V}^c)]$$

$$\text{s.t. } \|v^{cn}\|_F^2 - P_{max}^{cn} \leq 0, \forall n \in \mathcal{N}_c.$$

P6 can be equivalently decomposed into $N_c$ sub-problems, each corresponding to the precoding vector $v^{cn}$ for the n-th antenna in cell c as $$P7: \min_{v^{cn}} \frac{T_0}{S_i} \sum_{s \in S_i} 2\text{Re}\{tr\{\nabla_{v_i^{cn*}} f_{\tau_i^s}^H (V_i)(v^{cn} - v_i^{cn})\}\} + \alpha\|v^{cn} - v_i^{cn}\|_F^2 \quad (45)$$

$$+ [Q_{i+1}^c + T_0 \tilde{g}_c(\tilde{V}_i^c)][T_0 \gamma \|v^{cn}\|_F^2]$$

$$\text{s.t. } \|v^{cn}\|_F^2 - P_{max}^{cn} \leq 0$$

where $\nabla_{v_i^{cn*}} f_{\tau_i^s}(V_i) = h_{\tau_i^s}^{cnH}(\tilde{H}_{\tau_i^s}^c \tilde{V}_i^c - \tilde{D}_{\tau_i^s}^c)$ and $h_{\tau_i^s}^{cn}$ is the n-th column vector of $\tilde{H}_{\tau_i^s}^c$. By studying the KKT conditions, a closed-form solution for $v_{i+1}^{cno}$ is given by $$v_{i+1}^{cn\circ} = \begin{cases} x_i^{cn}, & \text{if } \|x_i^{cn}\|_F^2 \le P_{max}^{cn} \\ \frac{\sqrt{P_{max}^{cn}}}{\|x_i^{cn}\|_F} x_i^{cn}, & \text{else} \end{cases} \quad (46)$$

where $$x_i^{cn} = \frac{\alpha v_i^{cn} - \frac{T_0}{S_i} \sum_{s \in S_i} h_{\tau_i^s}^{cnH} \left( \hat{H}_{\tau_i^s}^c \tilde{V}_i^c - \tilde{D}_{\tau_i^s}^{c'} \right)}{\alpha + [Q_{i+1}^c + T_0 \tilde{g}_c(\tilde{V}_i^c)] T_0 \gamma}.$$

Numerical Performance Evaluation

Consider an InP that owns a cellular network consisting of $C=7$ urban hexagon micro-cells, each cell c is of 500 m radius and has a BS at the center equipped with $N_c=32$ antennas by default. The InP serves $M=4$ SPs, each SP m serves $K_c^m=2$ users, for a total of $K_c=8$ users in each cell c. Set maximum transmit power limit $P_{max}^c=33$ dBm, long-term transmit power limit $\overline{P}_c=32$ dBm, noise spectral density $N_0=-174$ dBm/Hz, noise figure $N_F=10$ dB, and transmission channel bandwidth $B_W=15$ kHz.

Figure 3:
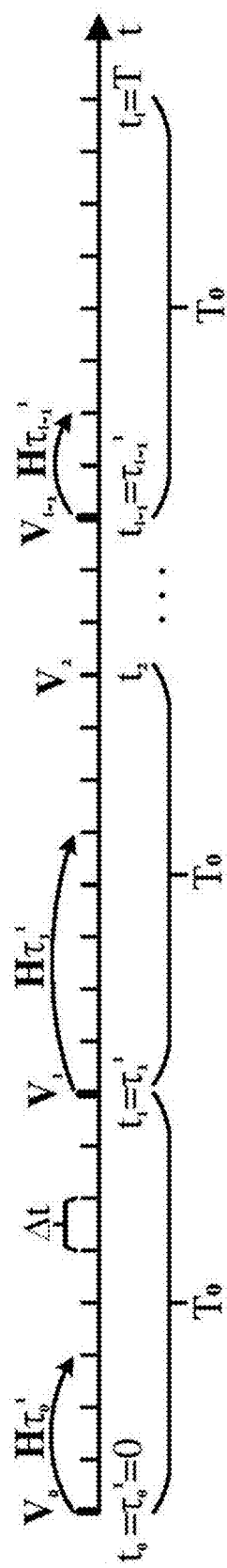
FIG. 3 is a timeline illustrating online precoding design for downlink MIMO WNV.
Figure 4A:
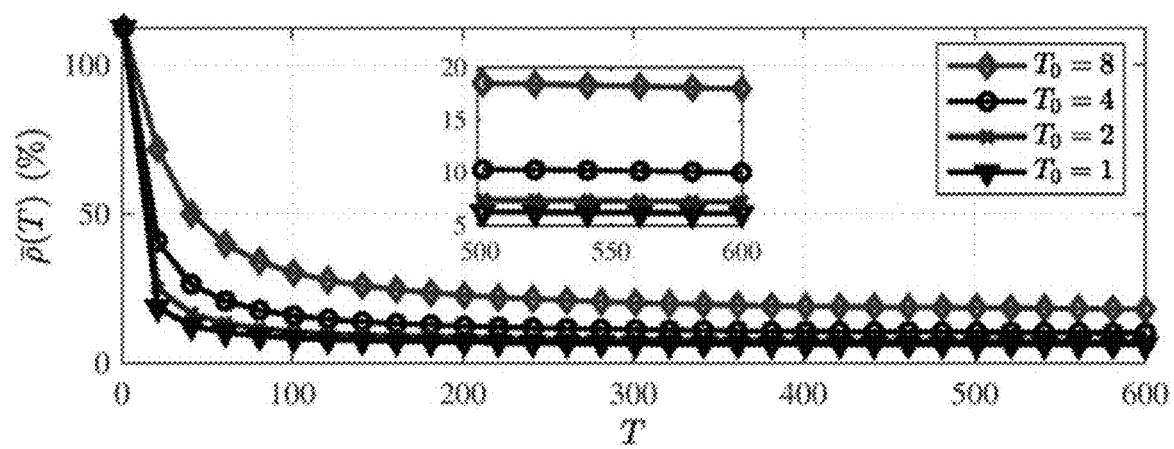
FIG. 4A is a graph of $\bar{\rho}(T)$ versus a time horizon, T.
Figure 4B:
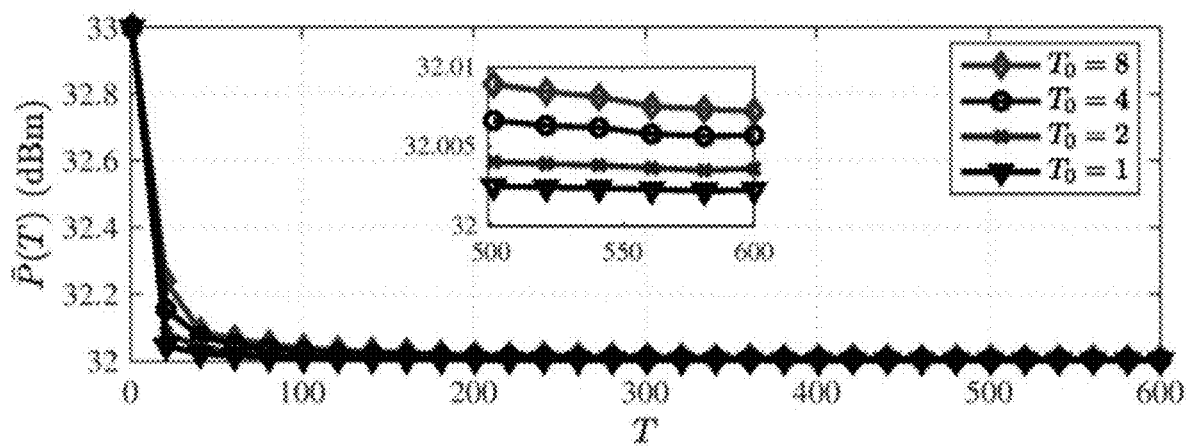
FIG. 4B is a graph of $\bar{P}(T)$ versus a time horizon T.
Figure 4C:
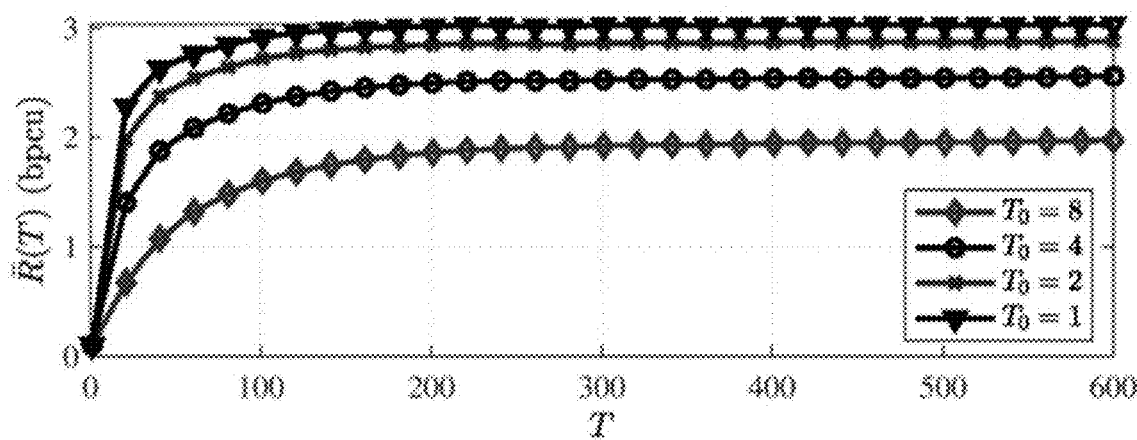
FIG. 4C is a graph of $\bar{R}(T)$ versus a time horizon T.
Figure 5A:
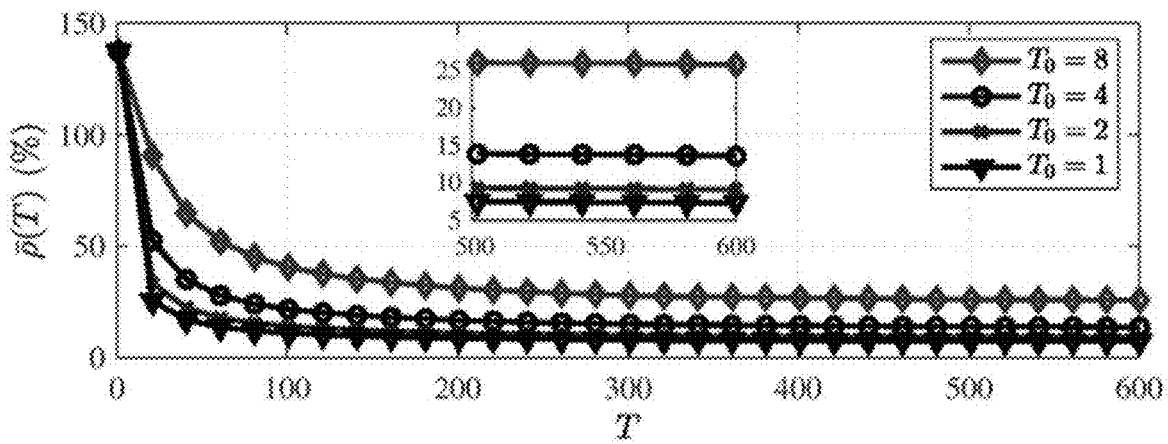
FIG. 5A is a graph of $\bar{\rho}(T)$ versus a time horizon, T.
Figure 5B:
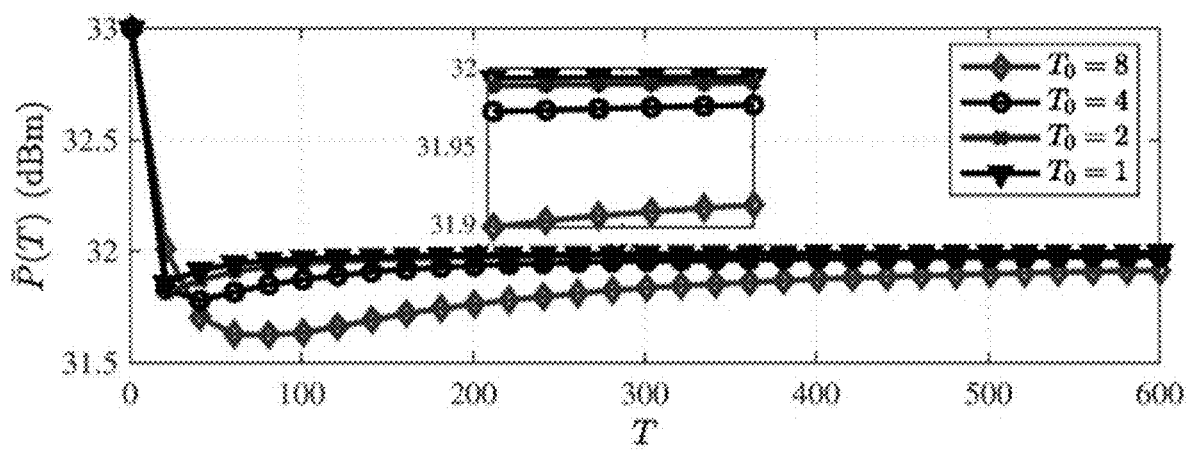
FIG. 5B is a graph of $\bar{P}(T)$ versus a time horizon T.
Figure 5C:
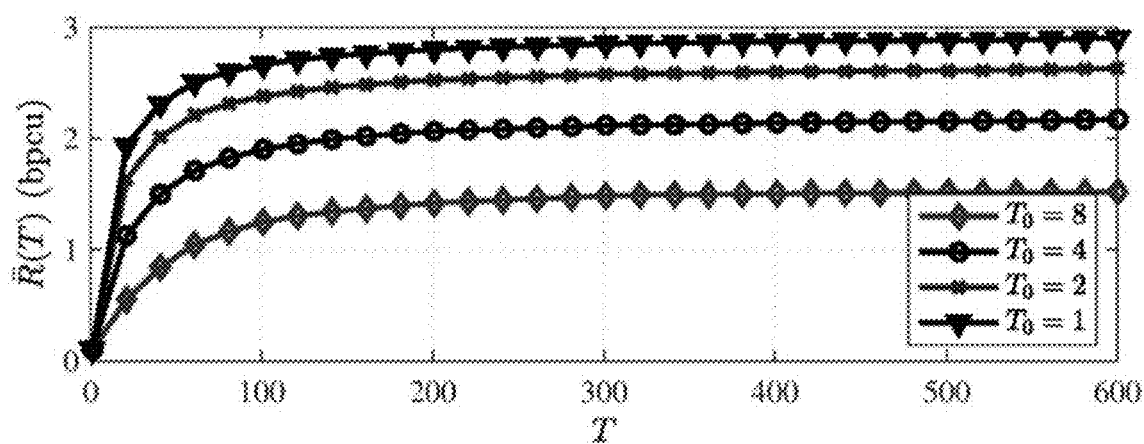
FIG. 5C is a graph of $\bar{R}(T)$ versus a time horizon T.

The fading channel is modeled as a first-order Gauss-Markov process $$h_{t+1}^{ck} = \alpha_h h_t^{ck} + z_t^{ck}$$

where $h_t^{ck} \sim \mathcal{CN}(0, \beta_{ck}I)$ is the channel state between user k and BS antennas in cell c, $\beta_{ck}[dB]=-31.54-33\log_{10}d_{ck}-\psi_{ck}$ captures path-loss and shadowing, $d_{ck}$ is the distance in kilometers from the BS in cell c to user k, $\psi_{ck} \sim \mathcal{CN}(0, \sigma_\varnothing^2)$ accounts for shadowing with a $\sigma_\varnothing=8$ dB, $\alpha_h$ is the channel correlation coefficient, and $z_t^{ck} \sim \mathcal{CN}(0, (1-\alpha_h^2)\beta_{ck}I)$ is independent of $h_t^{ck}$. For a coherence time of $$T_c = \frac{9}{16\pi f_d}$$

and transmission channel bandwidth $B_w$, $\alpha_h$ is determined by $$\alpha_h^{T_c B_W} = \varnothing \text{ where } f_d = \frac{v}{v_c} f_c$$

is the Doppler spread, v is the user speed assumed to be the same for all K users, $f_c=2.5$ GHz is the central frequency, $v_c$ is the speed of light, and $\varnothing=0.1$ is the level of de-correlation. For $\alpha_h=0.995$ as default in the simulation, $v \approx 3$ km/h. FIG. 3 shows a timeline illustrating online precoding design for downlink MIMO WNV. Under the standard LTE transmission frame structure, one symbol is transmitted with symbol duration $$\Delta t = \frac{1}{B_W} = 66.67 \text{ us}.$$

Define $\Delta t$ as one time slot and set the demand-response period $T_0=8\Delta t$ (533.6 us) as default in the simulation, such that $T_0$ can be seen as one slot (500 us) that consists of 6 or 7 symbol durations plus cyclic prefix under the standard LTE transmission frame settings. An overview of the default simulation parameters is shown in Table 1.

TABLE 1

| Parameter | Value |
| --- | --- |
| Number of cells C | 7 |
| Number of SPs M | 4 |
| Number of users per cell $K_c$ | 8 |
| Number of users per cell $N_c$ | 32 |
| Transmission channel bandwidth $B_W$ | 15 kHz |
| Central frequency $f_c$ | 2.5 GHz |
| Noise spectral density $N_0$ | −174 dBm/Hz |
| Noise figure $N_F$ | 10 dB |
| User speed v | 3 km/h |
| Maximum transmit power per cell $P_{max}^c$ | 33 dBm |
| Long-term transmit power limit per cell $\overline{P}_c$ | 32 dBm |
| Demand-response period $T_0$ | 8 |
| Number of channel feedbacks per period $S_i$ | 1 |
| Time horizon T | 600 |

For performance study, consider the cases where each SP m uses MRT or ZF precoding, which are two commonly used precoding schemes in current MIMO systems, to design their own virtual precoding matrices given by $$\hat{W}_t^{ccm} = \begin{cases} \alpha_t^{ccm} \hat{H}_t^{ccmH}, & MRT \\ \alpha_t^{ccm} \hat{H}_t^{ccmH} \left( \hat{H}_t^{ccm} \hat{H}_t^{ccmH} \right)^{-1}, & ZF \end{cases}$$

where $a_t^{ccm}$ is a power normalizing factor such that $$\|\hat{W}_t^{ccm}\|_F^2 = \frac{P_{max}^c}{M},$$

i.e., all SPs are allocated equal proportions of the maximum transmit power in each cell. Based on $\{V_i\}$ produced by Algorithm 2, define the normalized time-averaged precoding deviation from the virtualization demand as $$\overline{p}(T) \triangleq \frac{1}{T} \sum_{i \in \mathcal{J}} \sum_{t \in \mathcal{F}_i} \frac{f_t(V_i)}{\|D_t\|_F^2},$$

the time-averaged transmit power as $$\overline{P}(T) \triangleq \frac{T_0}{TC} \sum_{i \in \mathcal{J}} \|V_i\|_F^2,$$

and the time-averaged rate per user as $$\overline{R}(T) \triangleq \frac{1}{TK} \sum_{i \in \mathcal{J}} \sum_{t \in \mathcal{F}_i} \sum_{k \in \mathcal{K}} \log_2(1 + \text{SINR}_t^{ik}) \text{ where SINR}_t^{ik} = \frac{|h_t^{kT} v_i^k|^2}{\sigma_n^2 + \sum_{k' \in \mathcal{K}, k' \ne k} |h_t^{kT} v_i^{k'}|^2},$$

$h_t^k$ and $v_i^k$ are the channel state at time slot t and the precoding vector for the i-th demand-response period between user k and the N antennas, and $\sigma_n^2 = N_0 B_W + N_F$ is the noise power. For the upper bound B of the channel gain in Assumption 6, B is set as $B=1.645\sqrt{\sum_{c \in \mathcal{C}} N_c \sum_{\text{\tiny{}}} \beta_{ck}}$, which gives a Chernoff upper bound of $9.07 \times 10^{-14}$ for the probability of bound violation $\mathbb{P}\{\|H_t\|_F > B\}$.

Performance vs. Demand-Response Period $T_o$

First evaluate the performance of the disclosed algorithm described herein with different values of the demand-response period $T_0$. Consider the case where there is only one channel state feedback at the beginning of each demand-response period, i.e., $\mathcal{T}_i = \{iT_0\}, \forall i \in \mathcal{J}$, which is the same as the standard LTE transmission frame structure. FIGS. 4A, 4B, 4C, 5A, 5B and 5C show $\bar{\rho}(T)$, $\bar{P}(T)$, and $\bar{R}(T)$ versus time horizon T for different values of $T_0$, when all SPs adopt MRT and ZF precoding, respectively. Observe fast convergence of the disclosed algorithm (within 600 time slots). Then use the averaged value over the last 100 time slots as the steady-state value in the remaining simulation results. It can be seen that the system performance deteriorates as $T_0$ increases, which is because the underlying channel state keeps varying over time slots while $V_i$ is fixed for each update period. As can be seen from FIGS. 5A, 5B and 5C, as $T_0$ increases, $\bar{P}(T)$ converges slower since $V_i$ is fixed for a longer period and thus it is harder for the virtual queue vector $Q_i$ to converge. When all SPs adopt ZF precoding, the steady-state value of $\bar{\rho}(T)$ is more sensitive to $T_0$ compared with the MRT precoding case, as ZF precoding is known to be sensitive to channel noise and inaccuracy.

Performance Comparison

Figure 6A:
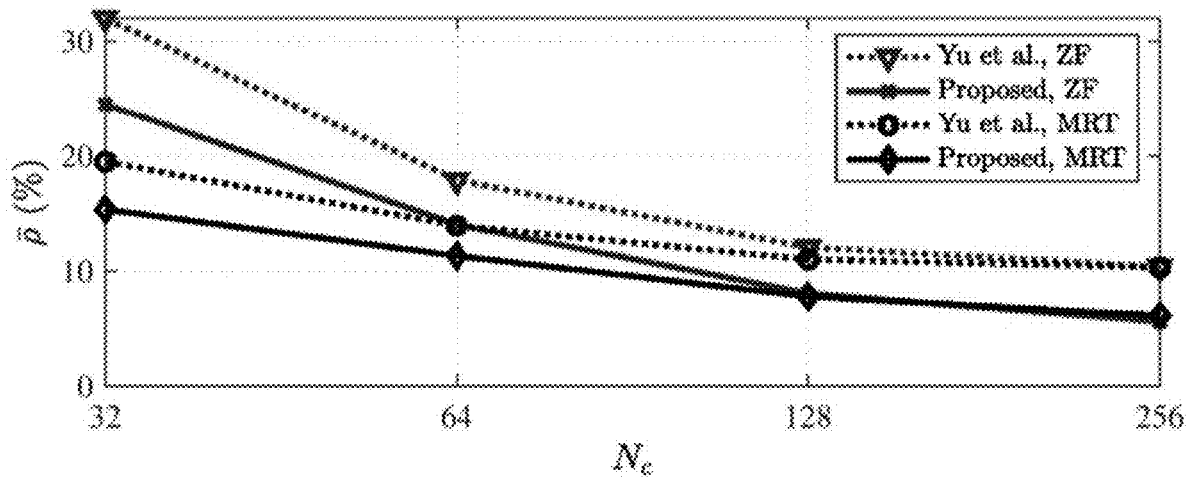
FIG. 6A is a graph of $\bar{\rho}(T)$ versus a number of antennas.
Figure 6B:
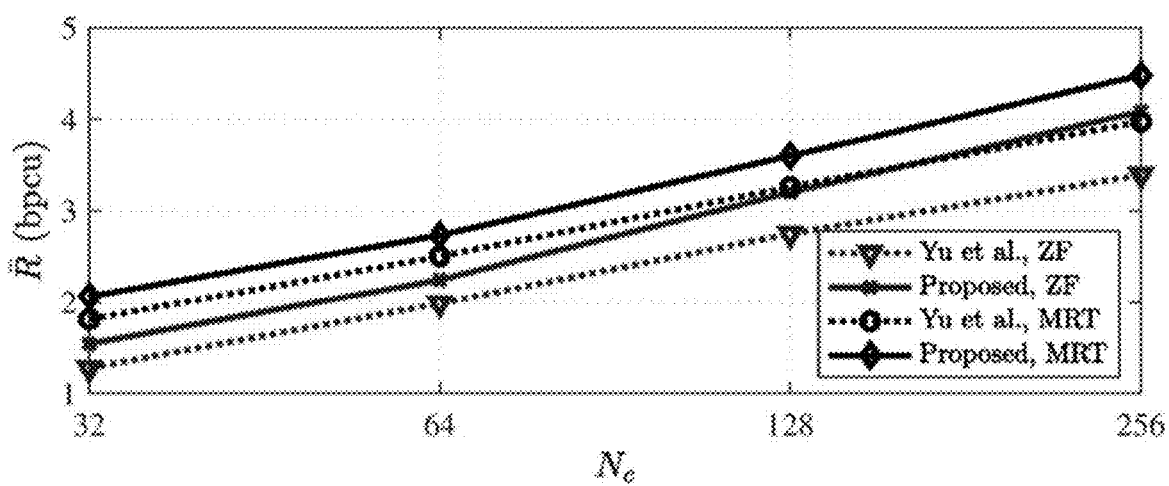
FIG. 6B is a graph of $\bar{R}(T)$ versus a number of antennas.

A performance comparison between the disclosed online downlink coordinated MIMO WNV algorithm is provided herein with a different, but generally related arrangement that discloses standard per-time-slot OCO settings and does not provide performance guarantees under the periodic update scenario. However, the information of the update period $T_0$ may be ignored. The steady-state precoding deviation $\bar{\rho}$ and rate per user $\bar{R}$ versus the number of antennas $N_c$, between the two algorithms as shown in FIGS. 6A and 6B, are compared. It can be seen that the performance advantage of the disclosed algorithm over the known arrangement becomes more substantial as $N_c$, increases, indicating the advantage of applying the disclosed algorithm to massive MIMO.

Performance vs. Optimal Offline Fixed Precoding Strategy

Figure 7A:
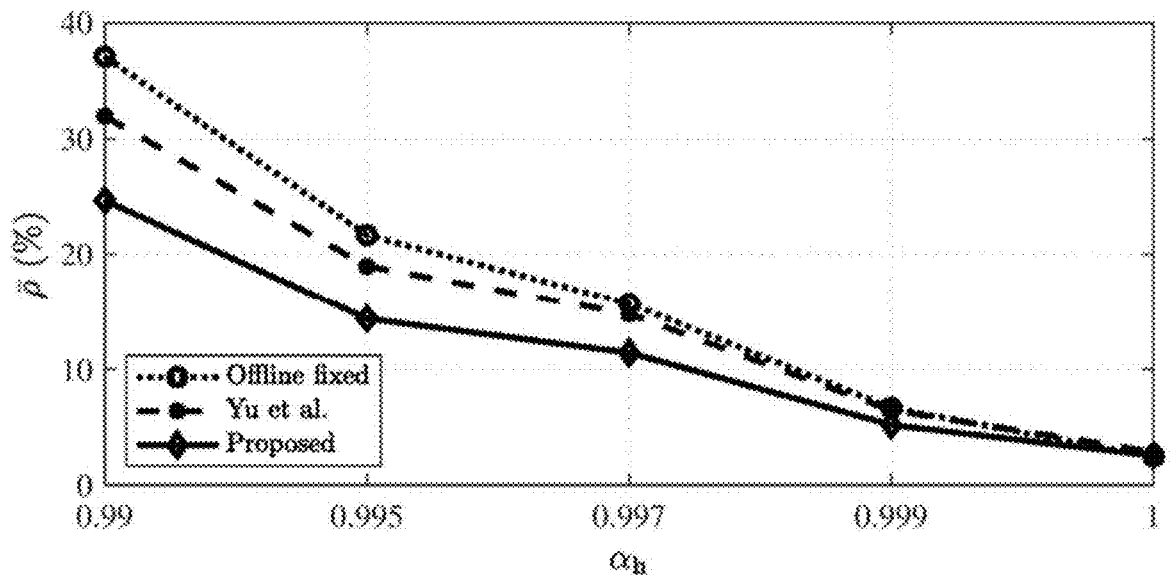
FIG. 7A is a graph of $\bar{\rho}(T)$ of the disclosed algorithm versus an offline algorithm.
Figure 7B:
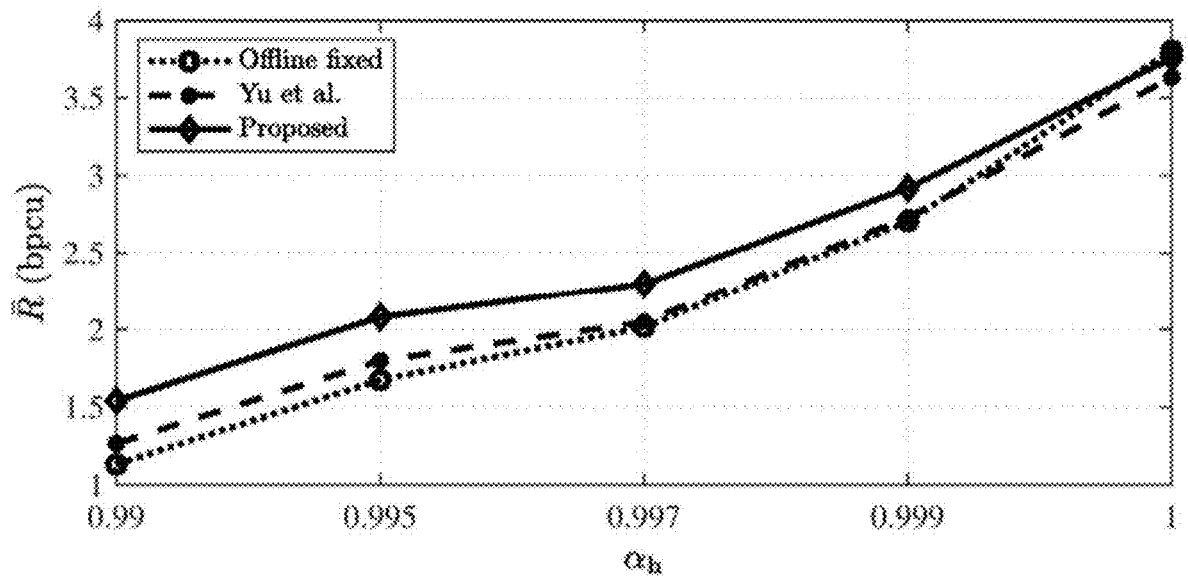
FIG. 7B is a graph of $\bar{R}(T)$ of the disclosed algorithm versus an offline algorithm.

FIGS. 7A and 7B show the performance of the disclosed algorithm compared with the one achieved with the offline fixed precoding strategy $V_{opt}^o$ that solves P5 and the one yielded by Yu et al., with different values of the channel correlation coefficient $\alpha_h$ and all SPs adopting MRT precoding. It can be seen that the disclosed algorithm achieves better system performance compared with the other two schemes, which shows that the disclosed algorithm is able to better suppress the interference for coordinated multi-cell MIMO precoding.

Performance vs. Long-term Transmit Power Limit $\bar{P}_c$

Figure 8A:
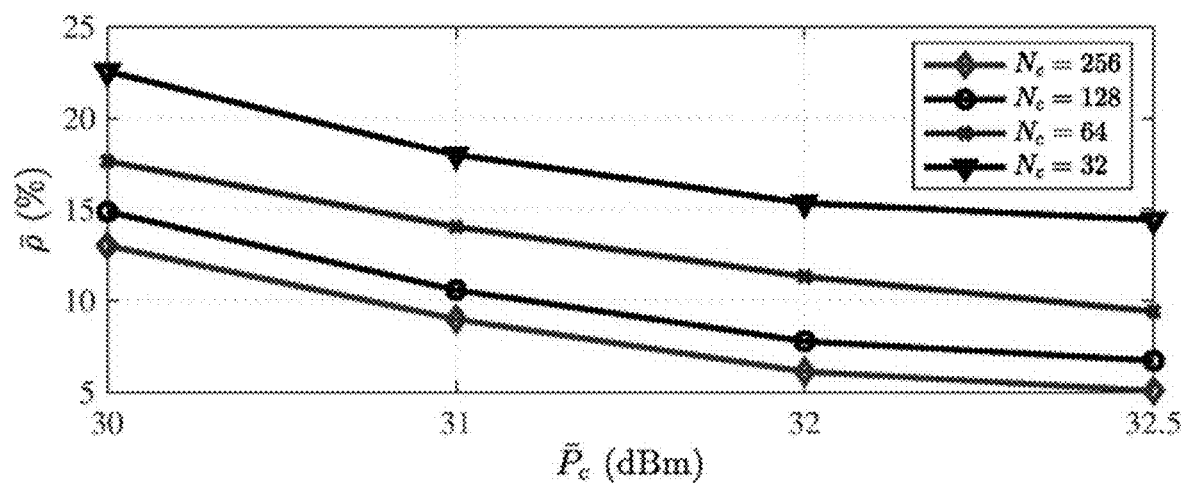
FIG. 8A is a graph of $\bar{\rho}(T)$ versus the long-term transmit power limit $\bar{P}_c$.
Figure 8B:
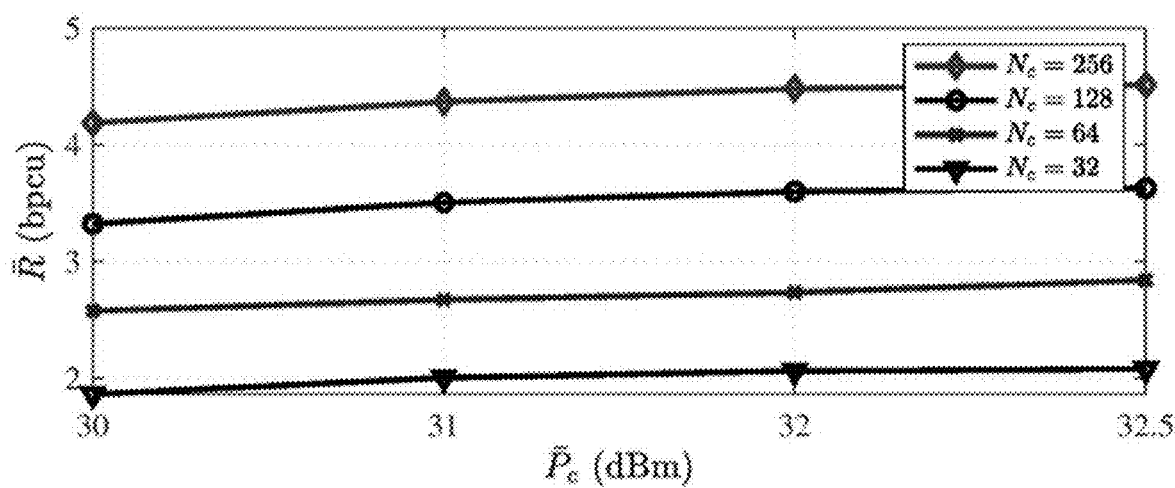
FIG. 8B is a graph of $\bar{R}(T)$ versus the long term transmit power limit $\bar{P}_c$.

The impact of the long-term transmit power limit $\bar{P}_c$ on the disclosed algorithm has been studied. See FIGS. 8A, and 8B which show that there is a natural trade-off between the steady-state rate per user R and the long-term transmit power limit $\bar{P}_c$, which allows the InP to balance the system performance and the energy consumption. The disclosed algorithm is applicable to massive MIMO, since the steady-state precoding deviations $\bar{\rho}$ vary within 10% as the number of antennas $N_c$, increasing from 32 to 256. The time-averaged rate per user R is 2.06 bpcu when $N_c=32$ compared with 4.48 bpcu when $N_c=256$, with the same long-term transmit power limit $\bar{P}_c=32$ dBm, indicating substantial performance gain of WNV in massive MIMO.

Performance vs. Number of Cells C

Figure 9A:
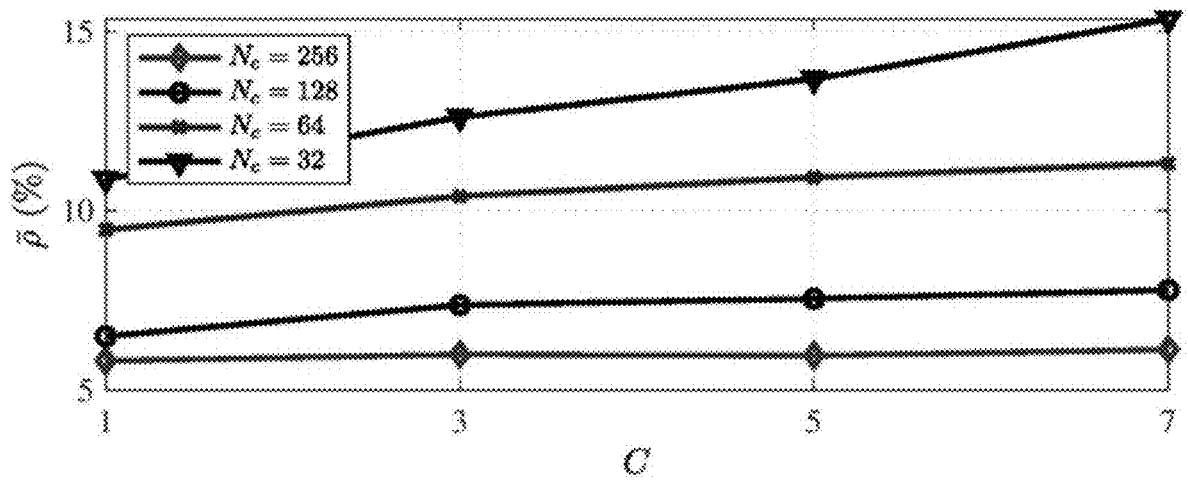
FIG. 9A is a graph of $\bar{\rho}(T)$ versus a number of cells.
Figure 9B:
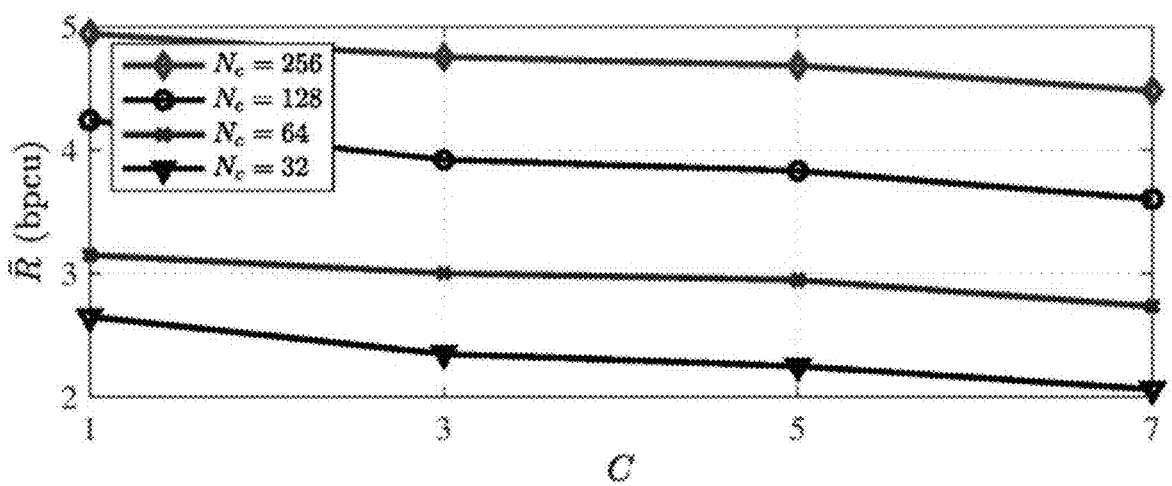
FIG. 9B is a graph of $\bar{R}(T)$ versus a number of cells.

The impact of the number of cells C on the performance of the algorithm provided herein is described with reference to FIGS. 9A and 9B. As C increasing, the inter-cell interference becomes more severe, and the steady-state precoding deviation $\bar{\rho}$ increases. However, the steady-state rate per user $\bar{R}$ is robust to the number of cells C, indicating the effectiveness of the coordinated multi-cell precoding design in handling the inter-cell interference. The impact of the number of cells C becomes smaller as the number of antennas $N_c$ increases, indicating the advantages of coordinated multi-cell WNV in massive MIMO.

Per-Antenna Transmit Power Constraint

Figure 10A:
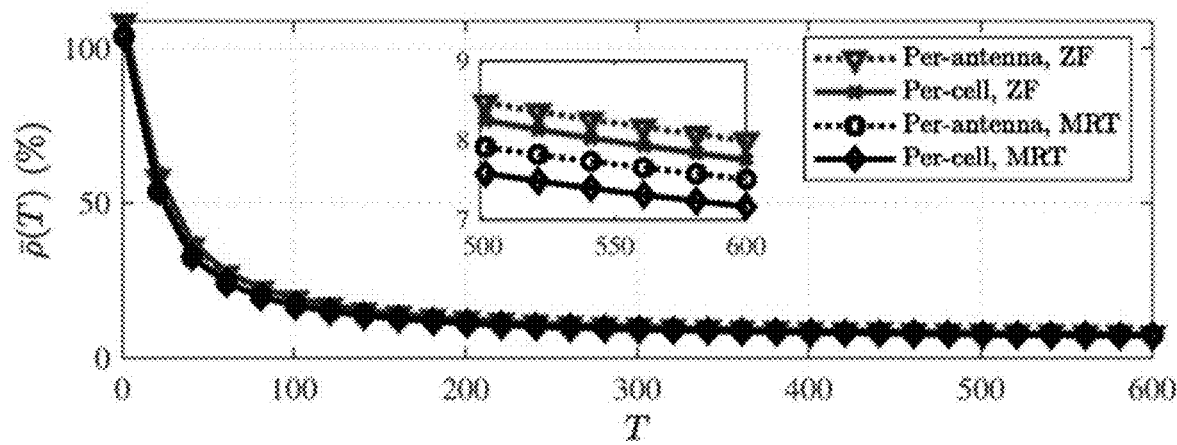
FIG. 10A is a graph of $\bar{\rho}(T)$ versus a time horizon, T.
Figure 10B:
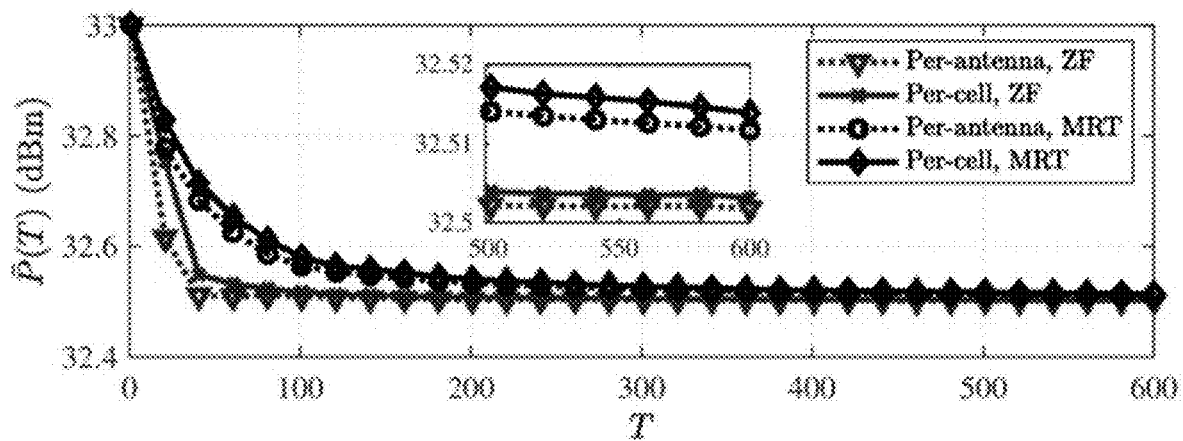
FIG. 10B is a graph of $\bar{P}(T)$ versus a time horizon T.
Figure 10C:
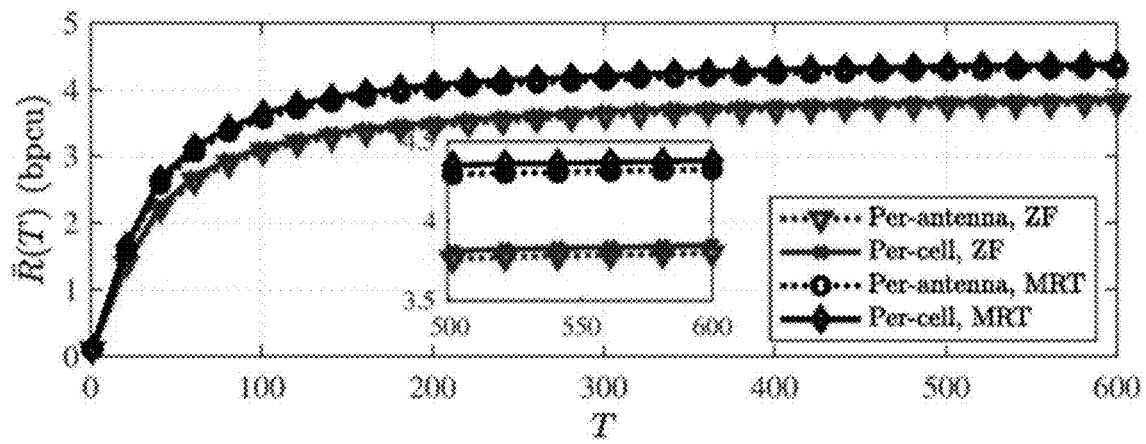
FIG. 10C is a graph of $\bar{R}(T)$ versus a time horizon T.

The impact of short-term per-antenna transmit power constraints on the system performance of the disclosed algorithm has been studied. As shown in FIGS. 10A, 10B and 10C, the number of antennas is set to $N_c=256$, the per-antenna maximum transmit power $$P_{max}^{cn} = \frac{P_{max}^c}{N_c},$$

and long-term transmit power limit $\bar{P}_c=32.5$ dBm, such that the per-antenna constraint is much stricter than the per-cell transmit power constraint. It can be seen that the system performance deteriorates after adding the per-antenna transmit power constraint, since it further limits the convex decision set $\mathcal{V}_0$ for the sequence of global precoding matrices $\{V_i\}$. The per-antenna constraint is observed to have negligible impact on the algorithm performance.

Thus, an OCO algorithm with periodic updates is provided herein. In existing standard OCO settings, decision making and convex loss function feedback are in a strict per-time-slot fashion. In contrast, the OCO algorithm described herein makes a decision at the beginning of each update period that can last for multiple time slots. The convex loss function can change arbitrarily at each time slot with unknown statistics. The gradient or sub-gradient feedbacks are allowed to be delayed for multiple time slots, received out of order, and missing for some time slots within each update period. Based only on the past gradient or sub-gradient information, the OCO algorithm described herein provides $O(\sqrt{T})$ regret defined with partial feedbacks and $O(1)$ long-term constraint violation.

An online downlink coordinated multi-cell MIMO WNV algorithm is disclosed, with unknown CDI and delayed CSI under standard LTE transmission frame settings. In the WNV framework, each SP is allowed to utilize all antennas and wireless spectrum resources simultaneously and design its own virtual precoding matrix in a cell without the need to be aware of the other SPs, or to consider the inter-cell interference created by its own users. The InP may coordinate the cells at the precoding level to minimize the current and future precoding deviations from the virtualization demands, based only on the past channel states and virtual precoding matrices. The sequence of global precoding matrices designed by the InP may subject to both long-term and short-term transmit power constraints. In such a case, the online coordinated multi-cell MIMO precoding problem has a distributed closed-form solution with low computational complexity. The disclosed algorithm provides theoretically guaranteed performance, as it yields $O(\sqrt{T})$ regret on the precoding deviation from the virtualization demand, and $O(1)$ long-term transmit power constraint violation.

The performance of the disclosed online downlink coordinated multi-cell MIMO WNV algorithm under typical LTE cellular network settings has been numerically validated. Simulation studies show fast convergence of the time-averaged performance. The disclosed algorithm shows substantial system performance advantage over an optimal offline fixed precoding strategy, and over the existing standard OCO algorithm with long-term constraints. Extensive simulation results are provided to demonstrate the impact of different values of demand-response period, precoding strategies adopted by the SPs, long-term transmit power limits, numbers of cells and antennas, and per-antenna transmit power constraint.

Figure 11:
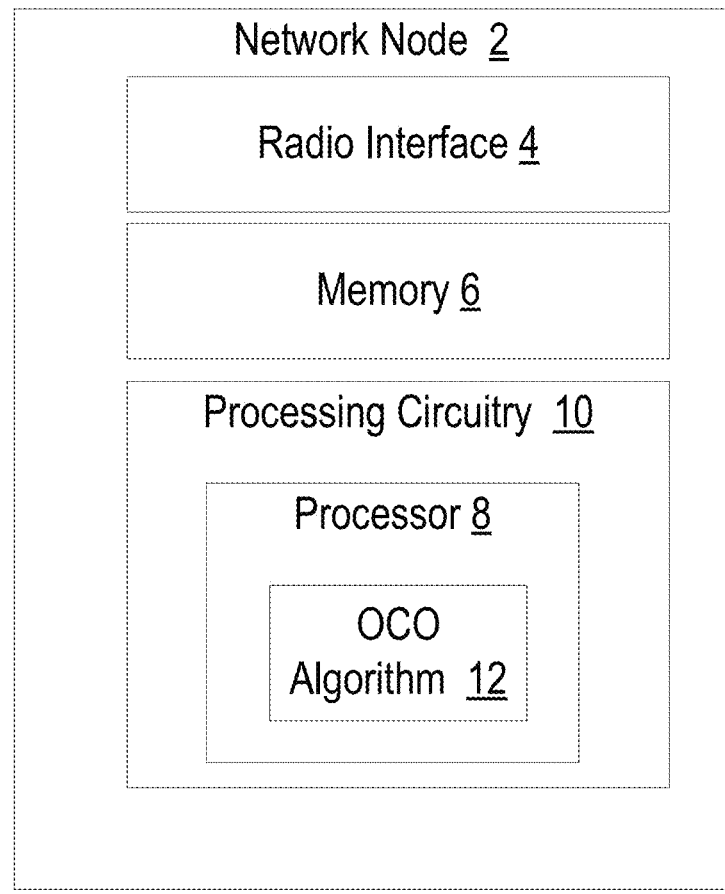
FIG. 11 is a block diagram of a network node constructed in accordance with principles set forth herein.

Referring to FIG. 11. one or more blocks described herein may be performed by one or more elements of network node 2 such as by one or more of processing circuitry 10 (including the OCO algorithm 12), processor 8, and radio interface 4. Network node 2 such as via processing circuitry 10 and/or processor 8 and radio interface 4, is configured to implement the OCO algorithm described herein. In some embodiments, the network node 2 is configurable by an infrastructure provider. A memory 6 stores data and computer code to cause the processor 8, which is part of processing circuitry 10, to execute an OCO algorithm as described above.

The radio interface 4 may be formed as or may include, for example, one or more RF transmitters, one or more RF receivers, and/or one or more RF transceivers. In particular, in addition to or instead of a processor, such as a central processing unit, and memory, the processing circuitry 10 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 8 may be configured to access (e.g., write to and/or read from) the memory 6, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). The processing circuitry 10 may be configured to control any of the methods and/or processes described herein and/or to cause such methods, and/or processes to be performed, e.g., by network node 2. Processor 8 corresponds to one or more processors for performing network node 2 functions described herein. The memory 6 is configured to store data, programmatic software code and/or other information described herein. In some embodiments, the OCO algorithm 12 may include instructions that, when executed by the processor 8 and/or processing circuitry 10, causes the processor 8 and/or processing circuitry 10 to perform the processes described herein with respect to network node 2. The network node 2, configured to execute the algorithm disclosed herein, may be operated by the infrastructure provider. The network node 2 may be in radio communication with one or more other network nodes operated or used by the service providers.

Figure 12:
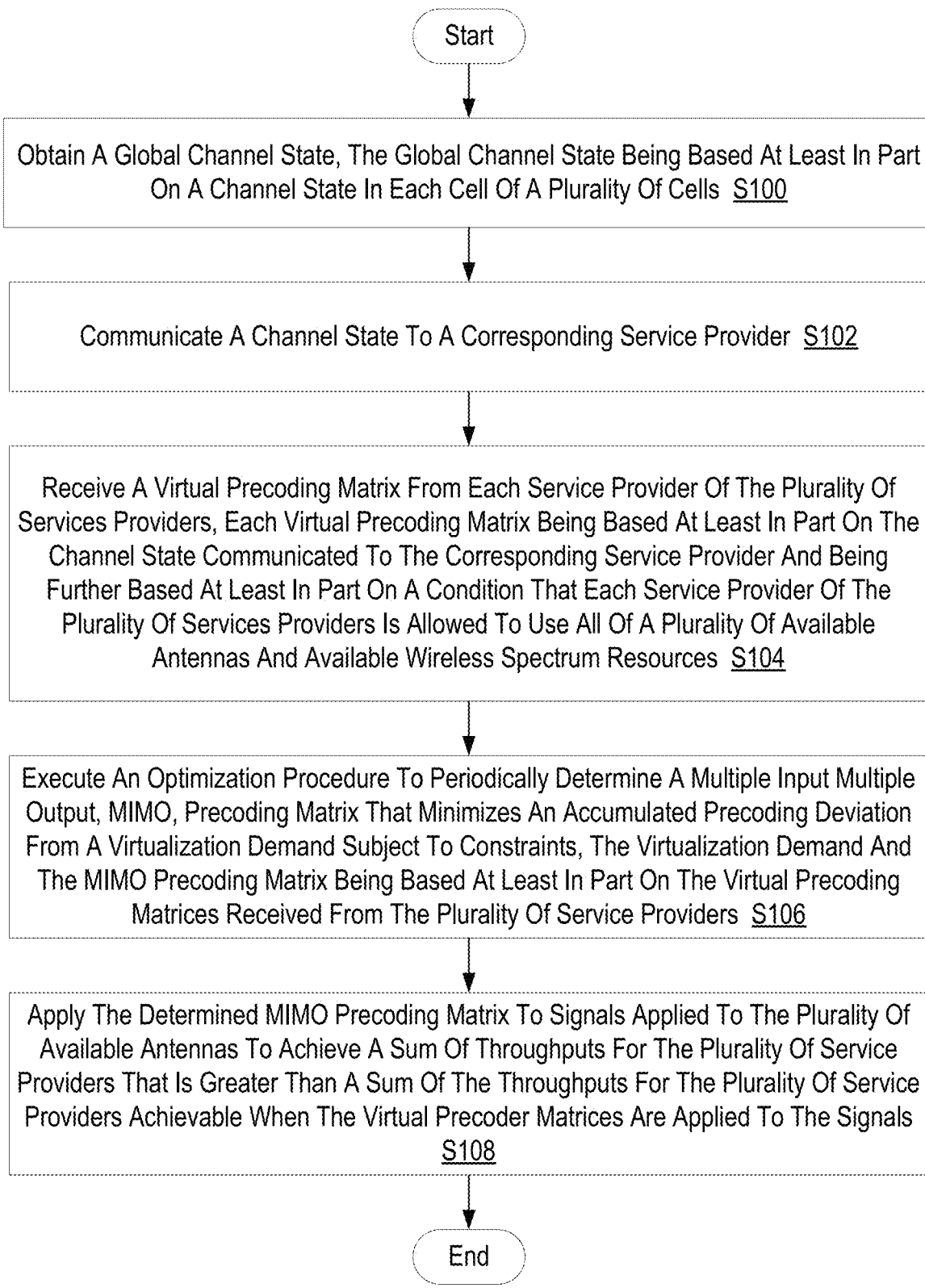
FIG. 12 is a flowchart of an exemplary process for determining a MIMO precoding matrix.

FIG. 12 is a flowchart of an exemplary process for determining a MIMO precoding matrix that minimizes an accumulated deviation from a virtualization demand subject to constraints. The process may be performed by the radio interface 4 and processing circuitry 10. The process includes obtaining a global channel state, the global channel state being based at least in part on a channel state in each cell of a plurality of cells (Block S100). The process also includes communicating a channel state to a corresponding service provider (Block S102). The process further includes receiving a virtual precoding matrix from each service provider of the plurality of services providers, each virtual precoding matrix being based at least in part on the channel state communicated to the corresponding service provider and being further based at least in part on a condition that each service provider of the plurality of services providers is allowed to use all of a plurality of available antennas and available wireless spectrum resources (Block S104). The process also includes executing an optimization procedure to periodically determine a multiple input multiple output, MIMO, precoding matrix that minimizes an accumulated precoding deviation from a virtualization demand subject to constraints, the virtualization demand and the MIMO precoding matrix being based at least in part on the virtual precoding matrices received from the plurality of service providers (Block S106). The process also includes applying the determined MIMO precoding matrix to signals applied to the plurality of available antennas to achieve a sum of throughputs for the plurality of service providers that is greater than a sum of the throughputs for the plurality of service providers achievable when the virtual precoder matrices are applied to the signals (Block S108).

Figure 13:
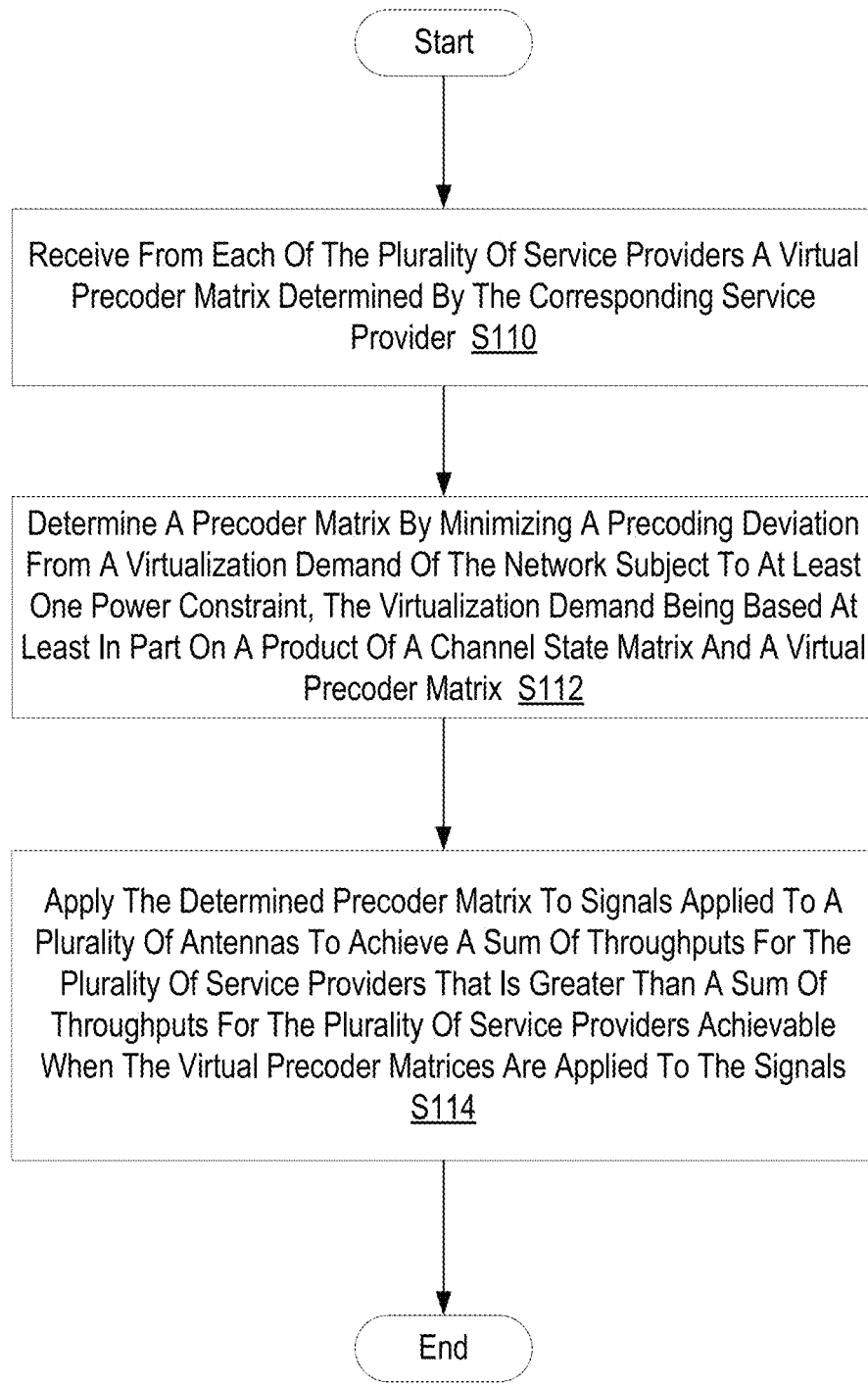
FIG. 13 is a flowchart of an alternative exemplary process for determining a MIMO precoding matrix.

FIG. 13 is a flowchart of an alternative exemplary process for determining a MIMO precoding matrix that minimizes an accumulated deviation from a virtualization demand subject to constraints. The process may be performed by the radio interface 4 and processing circuitry 10. The process includes receiving from each of the plurality of service providers a virtual precoder matrix determined by the corresponding service provider (Block S110). The process also includes determining a precoder matrix by minimizing a precoding deviation from a virtualization demand of the network subject to at least one power constraint, the virtualization demand being based at least in part on a product of a channel state matrix and a virtual precoder matrix (Block S112). The process further includes applying the determined precoder matrix to signals applied to a plurality of antennas to achieve a sum of throughputs for the plurality of service providers that is greater than a sum of throughputs for the plurality of service providers achievable when the virtual precoder matrices are applied to the signals (Block S114).

According to one aspect, a method of online coordinated multi-cell precoding for a network node 2 configurable at least in part by an infrastructure provider is provided. The network node 2 is configured to facilitate sharing of wireless network infrastructure resources by a plurality of service providers. The method includes obtaining, via the processing circuitry 10 a global channel state, the global channel state being based at least in part on a channel state in each cell of a plurality of cells and communicating a channel state to a corresponding service provider. The method also includes receiving, via the radio interface 4, a virtual precoding matrix from each service provider of the plurality of services providers, each virtual precoding matrix being based at least in part on the channel state communicated to the corresponding service provider and being further based at least in part on a condition that each service provider of the plurality of services providers is allowed to use all of a plurality of available antennas and available wireless spectrum resources. The method further includes executing, via the processing circuitry 10, an optimization procedure to periodically determine a multiple input multiple output, MIMO, precoding matrix that minimizes an accumulated precoding deviation from a virtualization demand subject to constraints, the virtualization demand and the MIMO precoding matrix being based at least in part on the virtual precoding matrices received from the plurality of service providers. The method includes applying, via the processing circuitry 10, the determined MIMO precoding matrix to signals applied to the plurality of available antennas to achieve a sum of throughputs for the plurality of service providers that is greater than a sum of the throughputs for the plurality of service providers achievable when the virtual precoder matrices are applied to the signals.

According to this aspect, in some embodiments, the optimization procedure includes periodically determining a gradient of a convex loss function and providing the determined gradient as feedback to the determination of the MIMO precoding matrix. In some embodiments, feedback in the optimization procedure is allowed to be delayed for multiple time slots, received out of order and/or partly missing within an update period. In some embodiments, the optimization procedure includes an online projected gradient ascent algorithm that provides $O(\sqrt{T})$ regret and $O(1)$ long term constraint violation, where T is a total time horizon over which multiple updates of the determined MIMO precoding matrix occur. In some embodiments, the accumulated precoding deviation is determined, via the processing circuitry 10, according to $\sum_{t \in \mathcal{T}} f_t(x_t)$ where T is a time horizon, $x_t$ is a decision in a sequence of decisions made by the network node 2, $f_t(x_t)$ is a convex loss function, $\sum_{t \in \mathcal{T}} f_t(x_t)$ is an accumulated loss and $x^0 \triangleq \arg\min_{x \in X_0} \sum_{t \in \mathcal{T}} f_t(x)$ is the argument of $\sum_{t \in \mathcal{T}} f_t(x)$ that produces a minimum value of $\sum_{t \in \mathcal{T}} f_t(x)$. In some embodiments, the method further includes dividing, via the processing circuitry 10, a total time horizon T into update periods, each update period having a duration of $T_o$ time slots, $T_o$ being at least one time slot, and updating the MIMO precoding matrix at a beginning or end of each update period. In some embodiments, at a beginning of each update period, a decision is taken, via the processing circuitry 10, from a known convex decision space and a loss is determined by an end of the duration of $T_o$ time slots based at least in part on the decision, the loss being based at least in part on a convex loss function. In some embodiments, the virtualization demand is further based at least in part on past channel states. In some embodiments, the constraints include long term transmit power constraints and short term transmit power constraints. In some embodiments, the MIMO precoding matrix is determined to provide sub-linear T-slot regret with partial feedback on the accumulated precoding deviation from the virtualization demand, where T is a total time horizon.

According to another aspect, a network node 2 configured for online coordinated multi-cell precoding, the network node 2 configurable at least in part by an infrastructure provider is provided. The network node 2 is configured to facilitate sharing of wireless network infrastructure resources by a plurality of service providers. The network node 2 includes processing circuitry 10 configured to: obtain a global channel state, the global channel state being based at least in part on a channel state in each cell of a plurality of cells and communicate a channel state to a corresponding service provider. The processing circuitry 10 is further configured to receive a virtual precoding matrix from each service provider of the plurality of services providers, each virtual precoding matrix being based at least in part on the channel state communicated to the corresponding service provider and being further based at least in part on a condition that each service provider of the plurality of services providers is allowed to use all of a plurality of available antennas and available wireless spectrum resources. The processing circuitry 10 is further configured to execute an optimization procedure to periodically determine a multiple input multiple output, MIMO, precoding matrix that minimizes an accumulated precoding deviation from a virtualization demand subject to constraints, the virtualization demand and the MIMO precoding matrix being based at least in part on the virtual precoding matrices received from the plurality of service providers. The processing circuitry 10 is further configured to apply the determined MIMO precoding matrix to signals applied to the plurality of available antennas to achieve a sum of throughputs for plurality of service providers that is greater than a sum of the throughputs for the plurality of service providers achievable when the virtual precoder matrices are applied to the signals.

According to this aspect, in some embodiments, the optimization procedure includes periodically determining a gradient of a convex loss function and providing the determined gradient as feedback to the determination of the MIMO precoding matrix. In some embodiments, feedback in the optimization procedure is allowed to be delayed for multiple time slots, received out of order and/or partly missing within an update period. In some embodiments, the optimization procedure includes an online projected gradient ascent algorithm that provides $O(\sqrt{T})$ regret and $O(1)$ long term constraint violation, where T is a total time horizon over which multiple updates of the determined MIMO precoding matrix occur. In some embodiments, the accumulated precoding deviation is determined, via the processing circuitry 10, according to $\sum_{t \in \mathcal{T}} f_t(x_t)$ where T is a time horizon, $x_t$ is a decision in a sequence of decisions made by an agent, $f_t(x_t)$ is a convex loss function, $\sum_{t \in \mathcal{T}} f_t(x_t)$ is an accumulated loss and $x^0 \triangleq \arg\min_{x \in X_0} \sum_{t \in \mathcal{T}} f_t(x)$ is the argument of $\sum_{t \in \mathcal{T}} f_t(x)$ that produces a minimum value of $\sum_{t \in \mathcal{T}} f_t(x)$. In some embodiments, the processing circuitry 10 is further configured to divide a total time horizon T into update periods, each update period having a duration of $T_o$ time slots, $T_o$ being at least one timeslot, and updating the MIMO precoding matrix at a beginning or end of each update period. In some embodiments, at a beginning of each update period, a decision is taken, via the processing circuitry 10, from a known convex decision space and a loss is determined by an end of the duration of $T_o$ time slots based at least in part on the decision, the loss being based at least in part on a convex loss function. In some embodiments, the virtualization demand is further based at least in part on past channel states. In some embodiments, the constraints include long term transmit power constraints and short term transmit power constraints. In some embodiments, the MIMO precoding matrix is determined to provide sub-linear T-slot regret with partial feedback on the accumulated precoding deviation from the virtualization demand, where T is a total time horizon.

According to yet another aspect, a network node 2 configured for sharing of wireless network resources among a plurality of service providers is provided. The network node 2 includes processing circuitry 10 configured to receive from each of the plurality of service providers a virtual precoder matrix determined by the corresponding service provider. The processing circuitry 10 is further configured to determine a precoder matrix by minimizing a precoding deviation from a virtualization demand of the network subject to at least one power constraint, the virtualization demand being based at least in part on a product of a channel state matrix and a virtual precoder matrix. The processing circuitry 10 is further configured to apply the determined precoder matrix to signals applied to a plurality of antennas to achieve a sum of throughputs for the plurality of service providers that is greater than a sum of throughputs for the plurality of service providers achievable when the virtual precoder matrices are applied to the signals.

According to this aspect, in some embodiments, determining the precoder matrix includes solving a minimization problem that includes determining a gradient of a convex loss function. In some embodiments, determining the precoder matrix includes decomposing the minimization problem into a number of subproblems, each subproblem involving a gradient of a convex loss function of a local precoding matrix. In some embodiments, the minimization problem includes comparing a function of the determined precoder matrix to an offline fixed precoding strategy. In some embodiments, the virtual precoder matrices received from the plurality of service providers are each based at least in part on a condition that each service provider is allowed to use all of a plurality of available antennas and wireless spectrum resources. In some embodiments, the precoding deviation from virtualization demand is determined, via the processing circuitry 10, at least in part by:

$$f_t(V) \triangleq \|H_t V - D_t\|_F^2$$

where V is a past precoding matrix, $H_t$ is the channel state and $D_t$ is the virtualization demand.

According to another aspect, a method of online coordinated multi-cell precoding for a network node 2 configurable at least in part by an infrastructure provider is provided, where the network node 2 is configured to facilitate sharing of wireless network infrastructure resources by a plurality of service providers. The method includes receiving, via the radio interface 4, from each of the plurality of service providers a virtual precoder matrix determined by the corresponding service provider. The method includes determining, via the processing circuitry 10, a precoder matrix by minimizing a precoding deviation from a virtualization demand of the network subject to at least one power constraint, the virtualization demand being based at least in part on a product of a channel state matrix and a virtual precoder matrix. The method also includes applying, via the processing circuitry 10, the determined precoder matrix to signals applied to a plurality of antennas to achieve a sum of throughputs for the plurality of service providers that is greater than a sum of throughputs for the plurality of service providers achievable when the virtual precoder matrices are applied to the signals.

According to this aspect, in some embodiments, determining the precoder matrix includes solving a minimization problem that includes determining a gradient of a convex loss function. In some embodiments, determining the precoder matrix includes decomposing the minimization problem into a number of subproblems, each subproblem involving a gradient of a convex loss function of a local precoding matrix. In some embodiments, the minimization problem includes comparing a function of the determined precoder matrix to an offline fixed precoding strategy. In some embodiments, the virtual precoder matrices received from the plurality of service providers are each based at least in part on a condition that each service provider is allowed to use all of a plurality of available antennas and wireless spectrum resources. In some embodiments, the precoding deviation from virtualization demand is determined, via the processing circuitry 10, at least in part by:

$$f_t(V) \triangleq \|H_t V - D_t\|_F^2$$

where V is a past precoding matrix, $H_t$ is the channel state and $D_t$ is the virtualization demand.

ABBREVIATIONS

5G: Fifth Generation
CDI: Channel Distribution Information
CSI: Channel State Information
C-RAN: Cloud Radio Networks
GP: Geometric Programming
InP: Infrastructure Provider
KKT: Karush-Kuhn-Tucker
LTE: Long-Term Evolution
MIMO: Multiple Input Multiple Output
NOMA: Non-orthogonal Multiple Access
OCO: Online Convex Optimization
OFDM: Orthogonal Frequency Division Multiplexing
SP: Service Provider
WNV: Wireless Network Virtualization As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows. Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method of online coordinated multi-cell precoding for a network node configurable at least in part by an infrastructure provider, the network node being configured to facilitate sharing of wireless network infrastructure resources by a plurality of service providers, the method comprising:
   obtaining a global channel state, the global channel state being based at least in part on a channel state in each cell of a plurality of cells;
   communicating a channel state to a corresponding service provider;
   receiving a virtual precoding matrix from each service provider of the plurality of services providers, each virtual precoding matrix being based at least in part on the channel state communicated to the corresponding service provider and being further based at least in part on a condition that each service provider of the plurality of services providers is allowed to use all of a plurality of available antennas and available wireless spectrum resources;
   executing an optimization procedure to periodically determine a multiple input multiple output, MIMO, precoding matrix that minimizes an accumulated precoding deviation from a virtualization demand subject to constraints, the virtualization demand and the MIMO precoding matrix being based at least in part on the virtual precoding matrices received from the plurality of service providers; and
   applying the determined MIMO precoding matrix to signals applied to the plurality of available antennas to achieve a sum of throughputs for the plurality of service providers that is greater than a sum of the throughputs for the plurality of service providers achievable when the virtual precoder matrices are applied to the signals.

2. The method of claim 1, wherein the optimization procedure includes periodically determining a gradient of a convex loss function and providing the determined gradient as feedback to the determination of the MIMO precoding matrix.

3. The method of claim 2, wherein feedback in the optimization procedure is allowed to be delayed for multiple time slots, at least one of:
   received out of order; and
   partly missing within an update period.

4. The method of claim 1, wherein the optimization procedure includes an online projected gradient ascent algorithm that provides $O(\sqrt{T})$ regret and $O(1)$ long term constraint violation, where T is a total time horizon over which multiple updates of the determined MIMO precoding matrix occur.

5. The method of claim 1, wherein the accumulated precoding deviation is determined according to $\sum_{t \in \mathcal{T}} f_t(x_t)$ where T is a time horizon, $x_t$ is a decision in a sequence of decisions made by the network node, $f_t(x_t)$ is a convex loss function, $\sum_{t \in \mathcal{T}} f_t(x_t)$ is an accumulated loss and $x^o \triangleq \arg\min_{x \in X_0} \sum_{t \in \mathcal{T}} f_t(x)$ is the argument of $\sum_{t \in \mathcal{T}} f_t(x)$ that produces a minimum value of $\sum_{t \in \mathcal{T}} f_t(x)$.

6. The method of claim 1, further comprising dividing a total time horizon T into update periods, each update period having a duration of $T_o$ time slots, $T_o$ being at least one time slot, and updating the MIMO precoding matrix at a beginning or end of each update period.

7. The method of claim 6, wherein at a beginning of each update period, a decision is taken from a known convex decision space and a loss is determined by an end of the duration of $T_o$ time slots based at least in part on the decision, the loss being based at least in part on a convex loss function.

8. The method of claim 1, wherein the virtualization demand is further based at least in part on past channel states.

9. The method of claim 1, wherein the constraints include long term transmit power constraints and short term transmit power constraints.

10. The method of claim 1, wherein the MIMO precoding matrix is determined to provide sub-linear T-slot regret with partial feedback on the accumulated precoding deviation from the virtualization demand, where T is a total time horizon.

11. A network node configured for online coordinated multi-cell precoding, the network node configurable at least in part by an infrastructure provider, the network node being configured to facilitate sharing of wireless network infrastructure resources by a plurality of service providers, the network node including processing circuitry configured to:
obtain a global channel state, the global channel state being based at least in part on a channel state in each cell of a plurality of cells;
communicate a channel state to a corresponding service provider;
receive a virtual precoding matrix from each service provider of the plurality of services providers, each virtual precoding matrix being based at least in part on the channel state communicated to the corresponding service provider and being further based at least in part on a condition that each service provider of the plurality of services providers is allowed to use all of a plurality of available antennas and available wireless spectrum resources;
execute an optimization procedure to periodically determine a multiple input multiple output, MIMO, precoding matrix that minimizes an accumulated precoding deviation from a virtualization demand subject to constraints, the virtualization demand and the MIMO precoding matrix being based at least in part on the virtual precoding matrices received from the plurality of service providers; and
apply the determined MIMO precoding matrix to signals applied to the plurality of available antennas to achieve a sum of throughputs for plurality of service providers that is greater than a sum of the throughputs for the plurality of service providers achievable when the virtual precoder matrices are applied to the signals.

12. The network node of claim 11, wherein the optimization procedure includes periodically determining a gradient of a convex loss function and providing the determined gradient as feedback to the determination of the MIMO precoding matrix.

13. The network node of claim 12, wherein feedback in the optimization procedure is allowed to be delayed for multiple time slots, at least one of:
received out of order; and
partly missing within an update period.

14. The network node of claim 11, wherein the optimization procedure includes an online projected gradient ascent algorithm that provides $O(\sqrt{T})$ regret and $O(1)$ long term constraint violation, where T is a total time horizon over which multiple updates of the determined MIMO precoding matrix occur.

15. The network node of claim 11, wherein the accumulated precoding deviation is determined according to $\sum_{t \in \mathcal{T}} f_t(x_t)$ where T is a time horizon, $x_t$ is a decision in a sequence of decisions made by the network node, $f_t(x_t)$ is a convex loss function, $\sum_{t \in \mathcal{T}} f_t(x_t)$ is an accumulated loss and $x^o \triangleq \arg\min_{x \in X_0} \sum_{t \in \mathcal{T}} f_t(x)$ is the argument of $\sum_{t \in \mathcal{T}} f_t(x)$ that produces a minimum value of $\sum_{t \in \mathcal{T}} f_t(x)$.

16. The network node of claim 11, wherein the processing circuitry is further configured to divide a total time horizon T into update periods, each update period having a duration of $T_o$ time slots, $T_o$ being at least one timeslot, and updating the MIMO precoding matrix at a beginning or end of each update period.

17. The network node of claim 16, wherein at a beginning of each update period, a decision is taken from a known convex decision space and a loss is determined by an end of the duration of $T_o$ time slots based at least in part on the decision, the loss being based at least in part on a convex loss function.

18. The network node of claim 11, wherein the virtualization demand is further based at least in part on past channel states.

19. The network node of claim 11, wherein the constraints include long term transmit power constraints and short term transmit power constraints.

20. The network node of claim 11, wherein the MIMO precoding matrix is determined to provide sub-linear T-slot regret with partial feedback on the accumulated precoding deviation from the virtualization demand, where T is a total time horizon.

* * * * *